US008791932B2

(12) United States Patent
Ueno et al.

(10) Patent No.: US 8,791,932 B2
(45) Date of Patent: Jul. 29, 2014

(54) DISPLAY DEVICE AND DISPLAY CONTROL METHOD

(75) Inventors: Masafumi Ueno, Osaka (JP); Hiroyuki Furukawa, Osaka (JP); Kazuyoshi Yoshiyama, Osaka (JP); Yasuhiro Ohki, Osaka (JP); Kenji Takase, Osaka (JP); Takashi Ishizumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 314 days.

(21) Appl. No.: 13/375,248

(22) PCT Filed: Feb. 17, 2010

(86) PCT No.: PCT/JP2010/000979

§ 371 (c)(1),
(2), (4) Date: Nov. 30, 2011

(87) PCT Pub. No.: WO2010/146735

PCT Pub. Date: Dec. 23, 2010

(65) Prior Publication Data

US 2012/0075274 A1    Mar. 29, 2012

(30) Foreign Application Priority Data

Jun. 18, 2009    (JP) ................................ 2009-145270

(51) Int. Cl.
*G09G 5/00* (2006.01)
*G09G 3/36* (2006.01)
*G09G 5/10* (2006.01)
*G09G 3/34* (2006.01)
*G02F 1/1335* (2006.01)

(52) U.S. Cl.
CPC ...... *G09G 3/3426* (2013.01); *G09G 2320/0646* (2013.01); *G09G 2360/141* (2013.01); *G09G 2360/142* (2013.01); *G09G 2320/0242* (2013.01); *G02F 1/133603* (2013.01); *G09G 2320/062* (2013.01); *G09G 2320/0626* (2013.01)
USPC .......................................... 345/207; 102/690

(58) Field of Classification Search
USPC .......................................... 345/102, 207, 690
See application file for complete search history.

(56) References Cited

U.S. PATENT DOCUMENTS

| | | | |
|---|---|---|---|
| 2006/0087486 A1* | 4/2006 | Lee ............................... | 345/102 |
| 2007/0097045 A1 | 5/2007 | Lee et al. | |
| 2008/0238860 A1 | 10/2008 | Onodera | |
| 2009/0140975 A1* | 6/2009 | Nonaka et al. ................ | 345/102 |

(Continued)

FOREIGN PATENT DOCUMENTS

| | | |
|---|---|---|
| CN | 1955795 | 5/2007 |
| JP | 64-059386 A | 3/1989 |

(Continued)

OTHER PUBLICATIONS

PCT/ISA/210 and PCT/ISA/237, Feb. 17, 2010.

*Primary Examiner* — Alexander Eisen
*Assistant Examiner* — Amit Chatly
(74) *Attorney, Agent, or Firm* — Harness, Dickey & Pierce, P.L.C.

(57) ABSTRACT

A display device includes: an LED control section (4) for carrying out control in which (i) an output luminance of an LED (10) whose measured luminance is deviated from a reference luminance or (ii) output luminances of peripheral LEDs (10) which are provided around the LED (10) is or are corrected, respectively, by using control information of the plurality of LEDs, which control information contains (a) information on measured luminances of the plurality of LEDs, the information being obtained by the plurality of photosensors (11) and (b) positional information of the plurality of LEDs, the positional information being obtained by the plurality of photosensors (11), and a liquid crystal display control section (3) for controlling, based on (i) video signals which have been subjected to the video signal process and are supplied from a video signal processing section (2) and (ii) the control information supplied from the LED control section (4), (a) levels of video signals to be supplied to pixels corresponding to the LED (10), whose output luminance is corrected or (b) levels of video signals to be supplied to pixels corresponding to the peripheral LEDs, whose output luminances are corrected, the reference luminance being a luminance which is originally expected to be outputted from each of the plurality of LEDs.

14 Claims, 9 Drawing Sheets

(56) References Cited

U.S. PATENT DOCUMENTS

2010/0002026 A1* 1/2010 Seetzen et al. ............... 345/690
2010/0245228 A1* 9/2010 Chen et al. ................... 345/102

FOREIGN PATENT DOCUMENTS

| | | |
|---|---|---|
| JP | 2001142409 A | 5/2001 |
| JP | 2007-052102 A | 3/2007 |
| JP | 2007163520 A | 6/2007 |
| JP | 2007163555 A | 6/2007 |
| JP | 2008145964 A | 6/2008 |
| JP | 2008249780 A | 10/2008 |
| JP | 2008310148 A | 12/2008 |
| JP | 2009237438 A | 10/2009 |
| WO | WO 03/077013 | 9/2003 |

* cited by examiner

----▶ RELATION BETWEEN LED 10 AND PHOTOSENSOR 11

F I G. 4
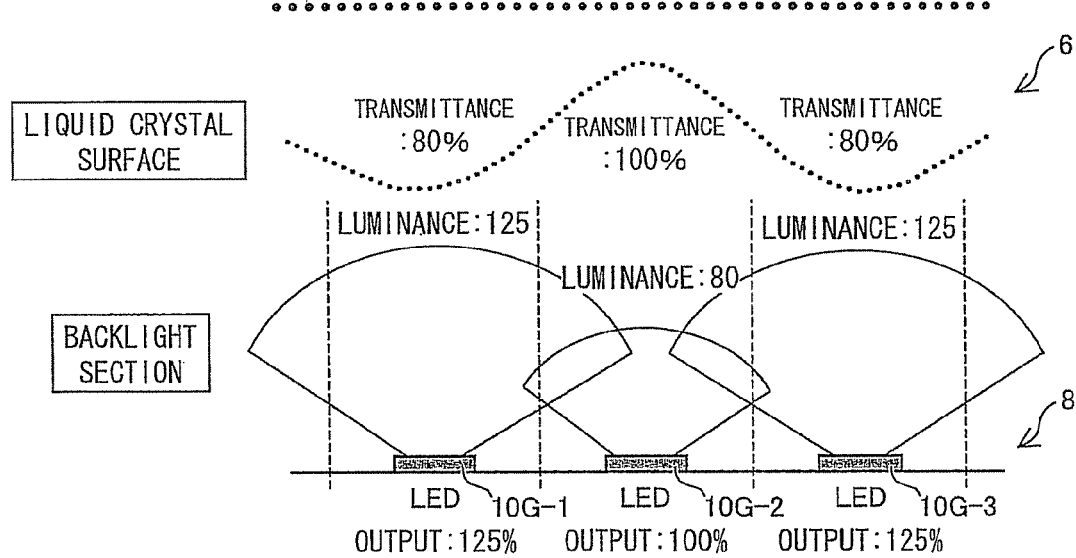

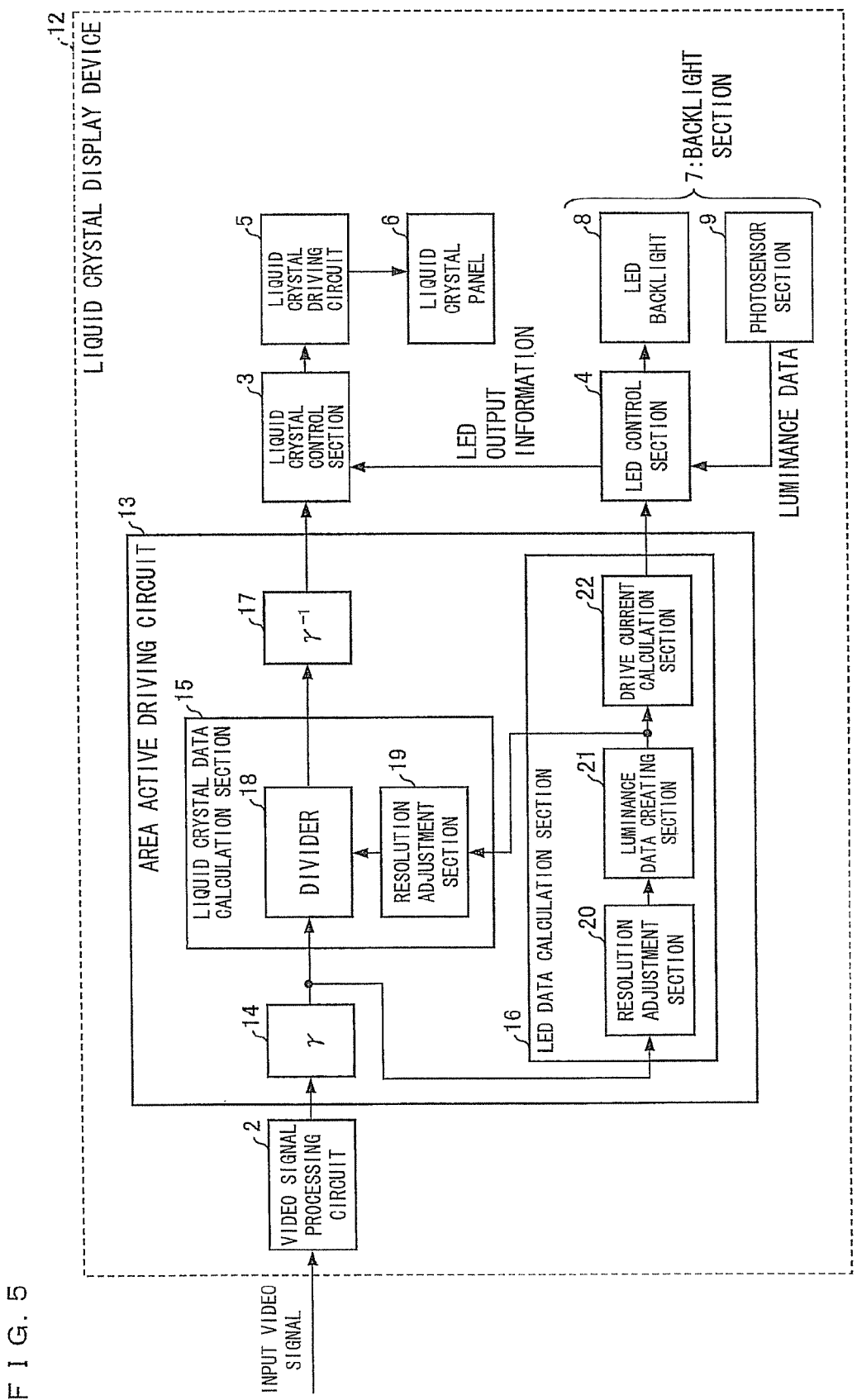
F I G. 5

FIG. 9
(a)
NON-UNIFORMITY OCCURRING
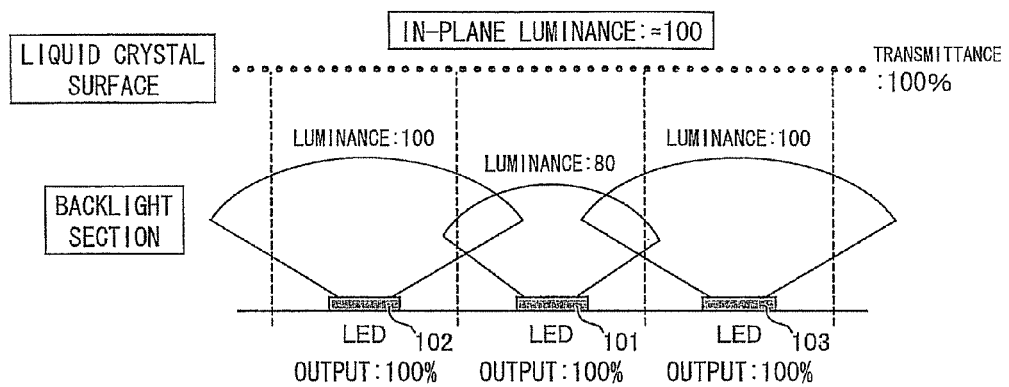
(b)
AFTER CONVENTIONAL CORRECTION
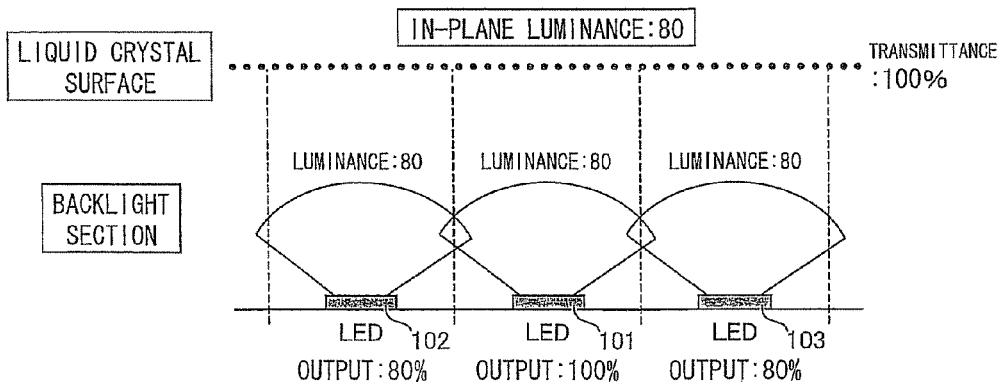

F I G. 1 0
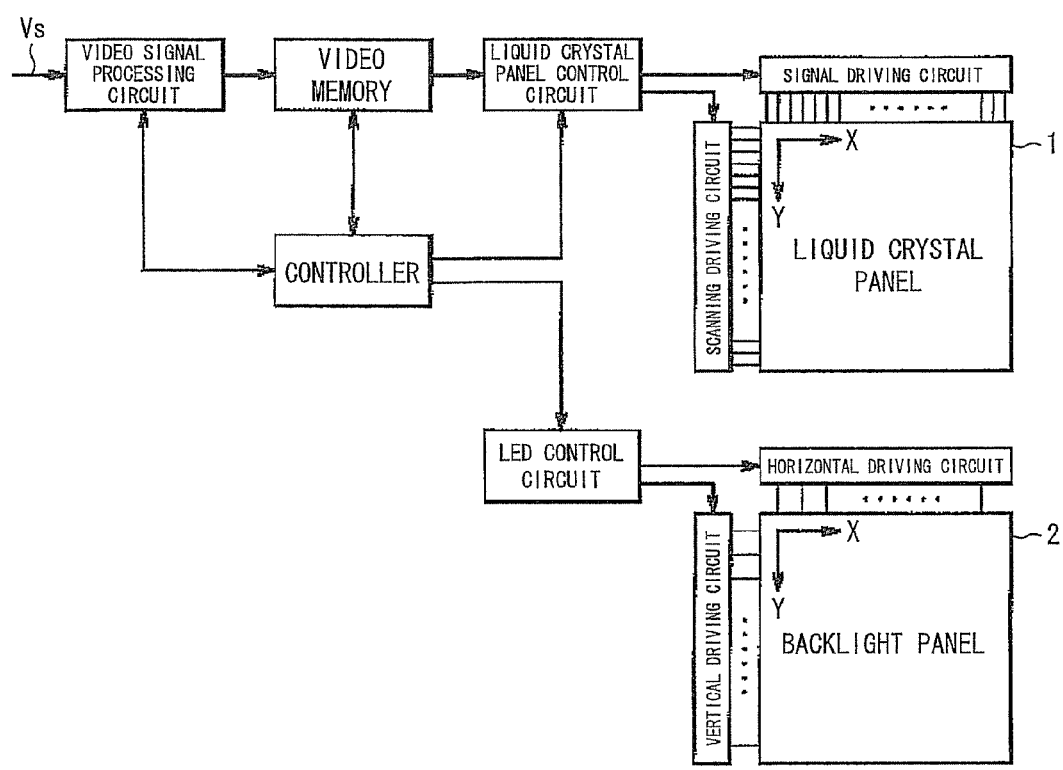

DISPLAY DEVICE AND DISPLAY CONTROL METHOD

TECHNICAL FIELD

The present invention relates to a display device and a display control method.

BACKGROUND ART

A liquid crystal display device employing a backlight unit and a liquid crystal panel has conventionally had a problem of in-plane luminance non-uniformity. The in-plane luminance non-uniformity is caused by, for example, (i) individual differences among light sources used in the backlight unit and/or (ii) in-plane transmittance (optical transmittance) non-uniformity of the liquid crystal panel.

As for the backlight unit, a backlight unit in which a plurality of LED light sources are arranged has been provided in recent years. What are particularly seen as problems in such a backlight unit are (i) individual differences in output luminance among LEDs and (ii), in a case where LEDs of colors R, G, and B are used, differences in output luminance among the LEDs due to variation in deterioration property among the LEDs of the respective colors.

In a case where area control of an LED backlight is carried out in a liquid crystal display device employing the LED backlight, cumulative light emitting time of an LED varies from light-emitting region to light-emitting region, and deterioration in degree of the LED accordingly varies from light-emitting region to light-emitting region. This ultimately causes the in-plane luminance non-uniformity.

Patent Literature 1 discloses, as a technique for addressing such problems, a liquid crystal display device. Specifically, according to the liquid crystal display device, (i) a photosensor for detecting a light emission luminance of each region where an LED is arranged so as to correct the in-plane luminance non-uniformity and (ii) a luminance detected by the photosensor is compared with a target value so that an output of the LED is corrected.

FIG. 9 is an explanatory view illustrating how the in-plane luminance non-uniformity occurs in a liquid crystal display device in which a conventional LED backlight is employed. (a) of FIG. 9 illustrates how the in-plane luminance non-uniformity occurs in the liquid crystal display device. (b) of FIG. 9 illustrates a state in which the in-plane luminance non-uniformity has been corrected in the liquid crystal display device.

As is clear from (a) of FIG. 9, an LED 101 in the middle is deteriorated and cannot output a luminance of 100, which is originally expected to be outputted by the LED 101 with 100% of its ability. The LED 101 is actually able to output a luminance of 80 instead of a luminance of 100. An LED 102 on the left and an LED 103 on the right, neither of which is deteriorated, are both able to output a luminance of 100 with 100% of their respective abilities. Since the luminance of the LED 101 in the middle is 80, a uniform in-plane luminance of 100 cannot be attained in a case where the liquid crystal panel has a transmittance of 100%. This causes the in-plane luminance non-uniformity.

In the state illustrated in (b) of FIG. 9, the luminance of the LED 102 on the left and the luminance of the LED 103 on the right are adjusted to a luminance of 80, which is a maximum luminance that can be outputted by the LED 101 in the middle which has been deteriorated. This allows each of the LEDs 101 through 103 to have a uniform luminance of 80, so that the in-plane luminance non-uniformity is corrected.

Patent Literature 2 discloses a method for making adjustment to non-uniformity of a luminance distribution on a surface of a liquid crystal panel in a liquid crystal display device in a case where a variation in brightness of a backlight causes the non-uniformity. Specifically, Patent Literature 2 discloses a method for correcting a video signal supplied to the liquid crystal display device so as to offset the non-uniformity in the luminance distribution on the surface of the liquid crystal panel.

Patent Literature 3 discloses a technique of carrying out area control of an LED backlight in a liquid crystal display device employing the LED backlight.

Specifically, Patent Literature 3 discloses an LED backlight in which a plurality of LEDs are arranged vertically and horizontally in a matrix manner and light emission of the plurality of LEDs can be controlled individually. Control is carried out in accordance with an input video so that (i) only a pixel region that needs illumination light is irradiated with the illumination light and (b) a pixel region that has been colored deep-black is not irradiated with illumination light. A drive signal that can attain an optimum display is supplied to the liquid crystal panel, in consideration of the control of the LED backlight. This brings about effects such as of (i) lowering power consumption, which is made possible by turning off an LED in a region where the LED is unnecessary and (ii) improving contrast, which is made possible by reduction in black level luminance.

FIG. 10 is a circuit configuration diagram illustrating a control system of a conventional liquid crystal display device in accordance with Patent Literature 3. The circuit configuration illustrated in FIG. 10 generates, on the basis of a supplied video signal Vs, (i) LED control data for controlling light emission from each region of the backlight panel 2 and (ii) liquid crystal control data for displaying an optimum video on a liquid crystal panel 1 in accordance with a luminance of the backlight panel 2.

CITATION LIST

Patent Literature

Patent Literature 1
Japanese Patent Application Publication, Tokukai, No. 2008-145964 A (Publication Date: Jun. 26, 2008)
Patent Literature 2
Japanese Patent Application Publication, Tokukai, No. 2007-163555 A (Publication Date: Jun. 28, 2007)
Patent Literature 3
Japanese Patent Application Publication, Tokukai, No. 2001-142409 A (Publication Date: May 25, 2001)

SUMMARY OF INVENTION

Technical Problem

However, the inventions described in Patent Literature 1 through 3 have the following problems.

According to the invention in accordance with Patent Literature 1, uniformity of LED light emission luminance cannot be achieved over an entire screen without causing a reduction in the LED light emission luminance over the entire screen. This is because it is necessary that outputs of LEDs, other than an LED having a lowest light emission luminance on the screen, be adjusted to an output of the LED having the lowest light emission luminance.

According to the invention in accordance with Patent Literature 2, it is impossible to make a correction in a case where a signal supplied to the liquid crystal device is maximum (e.g. the 255th level of 8-bit gray scale levels) in a region where a luminance is 'dark' due to the variations in brightness of the backlight. This is because it is not possible to further increase the gray scale level of the signal which is maximum. In order to make correction in such a case, a configuration is required in which an allowance (offset) is secured in advance on a highest side of the display gray scale level and on a lowest side of the display gray scale level. Such a configuration causes a range of gray scale levels to be reduced and a maximum display luminance to be lowered. This ultimately causes a loss in display performance.

Further, the invention in accordance with Patent Literature 3 has problems of (i) individual differences in output luminance among the LEDs and (ii), in a case where LEDs of colors R, G, and B are used, individual differences due to variation in aged deterioration property among the LEDs of the respective colors.

The present invention, is accomplished in view of the problem. An object of the present invention is to provide a display device and a display control method, both of which allow correction of luminance non-uniformity of or a color drift in a display plane, which is caused by (i) differences in the luminance of a backlight and/or (ii) aged deterioration, without causing (a) a reduction in luminance over an entire screen and (b) a loss in display gray scales.

Solution to Problem

In order to attain the object, a display device of the present invention is a display device including: a display panel in which a plurality of pixels are arranged; a backlight section including (i) a plurality of light-emitting elements arranged in a matrix manner and (ii) a plurality of photosensors arranged in a matrix manner; a video signal processing section for carrying out a video signal process with respect to an input video signal supplied to the display device; a light-emitting element control section for carrying out control in which (i) an output luminance of a light-emitting element whose measured luminance is deviated from a reference luminance or (ii) output luminances of peripheral light-emitting elements which are provided around the light-emitting element is or are corrected, respectively, by use of control information of the plurality of light-emitting elements, which control information contains (a) information on measured luminances of the plurality of light-emitting elements, the information being obtained by the plurality of photosensors and (b) positional information of the plurality of light-emitting elements, the positional information being obtained by the plurality of photosensors, and; a display control section for controlling, on the basis of (i) a plurality of video signals which have been subjected to the video signal process and are supplied from the video signal processing section and (ii) the control information supplied from the light-emitting element control section, (a) levels of video signals to be supplied to pixels corresponding to the light-emitting element, whose output luminance is corrected or (b) levels of video signals to be supplied to pixels corresponding to the peripheral light-emitting elements, whose output luminances are corrected, the reference luminance being a luminance which is originally expected to be outputted from each of the plurality of light-emitting elements.

According to the invention, both (i) control of luminances of light-emitting elements and (ii) control of levels of video signals to be supplied to pixels are carried out. This makes it possible to correct non-uniformity of luminance of the liquid crystal panel, which non-uniformity is caused by a light-emitting element that emits light with a luminance deviating from a reference luminance.

More specifically, the controls of the present invention encompasses the following controls.

(First Control)

In a case where a light-emitting element emitting light with a luminance deviating from the reference luminance is detected by the photosensor, (i) luminances of light-emitting elements located around the light-emitting element are controlled, so that the luminance deviating from the reference luminance is compensated and (ii) levels of video signals, to be supplied to pixels corresponding to the light-emitting elements whose luminances are changed, are controlled so as to have changes reverse to those of the luminances. This makes it possible to maintain uniformity of luminance of the display panel even if luminances of light emitted from the light-emitting elements are changed.

Note that 'a luminance deviating from the reference luminance' encompasses (i) a luminance that exceeds the reference luminance and becomes therefore too 'bright' and (ii) a luminance that is below the reference luminance and becomes therefore 'dark.'

(Second Control)

Control is carried out so as to (i) cause a light-emitting element, which has become 'dark' due to a decrease in its light-emitting ability, to emit light with a maximum luminance and (ii) increase a level of a video signal to be supplied to a pixel corresponding to the light-emitting element is increased. This makes it possible to maintain uniformity of luminance of the display panel even if a luminance of light emitted from the light-emitting element is changed.

According to the first or second control, it becomes possible to correct in-plane luminance non-uniformity of the display device, so that the display device has a uniform in-plane luminance. This makes it possible to correct luminance non-uniformity of or a color drift in a display plane, which is caused by (i) differences in the luminance of a backlight and/or (ii) aged deterioration, without causing (a) a reduction in luminance over an entire screen and (ii) a loss in display gray scales.

In order to attain the object, a display device of the present invention is a display device including a display panel in which a plurality of pixels are arranged; a backlight section including (i) a plurality of light-emitting elements arranged in a matrix manner and (ii) a plurality of photosensors arranged in a matrix manner; a video signal processing section for carrying out a video signal process with respect to an input video signal supplied to the display device; and an area driving section for supplying to the plurality of light-emitting elements, as light-emitting element data, output luminances modulated in accordance with levels of video signals to be supplied to pixels in one of a plurality of small regions into which a display region, which is constituted by the entire plurality of pixels, is divided, the area driving section including a light-emitting element correcting section and a luminance data creating section, the light-emitting element correcting section creating a light-emitting element correction signal obtained by correcting (i) an output luminance of a specific light-emitting element whose measured luminance is deviated from a reference luminance or (ii) output luminances of peripheral light-emitting elements which are provided around the specific light-emitting element by use of (a) the light-emitting element data supplied from the area driving section, (b) the information on the measured luminances of the plurality of light-emitting elements, the information being obtained by the plurality of photosensors, and (c) the positional information of the plurality of light-emitting elements, the positional information being obtained by the plurality of photosensors, the luminance data creating section controlling levels of video signals, to be supplied to (a) pixels corresponding to the specific light-emitting element whose output luminance is corrected or (b) pixels corresponding to the peripheral light-emitting elements whose output luminances are corrected, so that pixels, located around a pixel corresponding to a center of the specific light-emitting element, have transmittance distributions which exhibit respective changes reverse to those of a luminance distribution of the specific light-emitting element and the peripheral light-emitting elements.

According to the invention, the luminance data creating section controls the levels of the video signals, to be supplied to (a) the pixels corresponding to the specific light-emitting element whose output luminance is corrected or (b) pixels corresponding to the peripheral light-emitting elements whose output luminances are corrected, so that the pixels, located around the pixel corresponding to the center of the specific light-emitting element, have the transmittance distributions which exhibit respective changes reverse to those of the luminance distribution of the specific light-emitting element and the peripheral light-emitting elements.

This eliminates the need for the liquid crystal display device to include the display control section, which is provided in the early-described liquid crystal display device. Since the light-emitting element correcting section is provided in the area active driving section, correction can be carried out more efficiently and accurately.

A display control method for use in a display device of the present invention is a display control method for a display device which displays a video on a display panel by modulating, on the basis of a video signal, transmittances of a plurality of pixels which transmittances are shown when light emitted from a plurality of light-emitting elements, which are arranged in a matrix manner with respect to the display panel including the plurality of pixels, transmits through the plurality of pixels, said display control method comprising the steps of: correcting luminances of peripheral light-emitting elements, which are provided around a specific light-emitting element, so as to compensate a luminance deviation of the specific light-emitting element from a reference luminance; and correcting transmittances of peripheral pixels, located around a pixel corresponding to a center of the specific light-emitting element so that the peripheral pixels have transmittance distributions which exhibit respective changes reverse to those of a luminance distribution of the specific light-emitting element and the peripheral light-emitting elements.

According to the invention, both (i) control of the luminances of the peripheral light-emitting elements and (ii) correction of the transmittances of the pixels are carried out. It is therefore possible to correct non-uniformity of luminance of the display panel, which non-uniformity caused by a specific light-emitting element that emits light with a luminance deviated from the reference luminance. This allows the in-plane luminance of the display device to be uniform. As such, it is possible to correct luminance non-uniformity of or a color drift in a display plane, which is caused by differences in the luminance of a backlight and/or aged deterioration, without causing (i) a reduction in luminance over an entire screen and (ii) a loss in display gray scales.

Advantageous Effects of Invention

As described above, a liquid crystal display device of the present invention includes: a display panel in which a plurality of pixels are arranged; a backlight section including (i) a plurality of light-emitting elements arranged in a matrix manner and (ii) a plurality of photosensors arranged in a matrix manner; a video signal processing section for carrying out a video signal process with respect to an input video signal supplied to the display device; a light-emitting element control section for carrying out control in which (i) an output luminance of a light-emitting element whose measured luminance is deviated from a reference luminance or (ii) output luminances of peripheral light-emitting elements which are provided around the light-emitting element is or are corrected, respectively, by use of control information of the plurality of light-emitting elements, which control information contains (a) information on measured luminances of the plurality of light-emitting elements, the information being obtained by the plurality of photosensors and (b) positional information of the plurality of light-emitting elements, the positional information being obtained by the plurality of photosensors, and; a display control section for controlling, on the basis of (i) a plurality of video signals which have been subjected to the video signal process and are supplied from the video signal processing section and (ii) the control information supplied from the light-emitting element control section, (a) levels of video signals to be supplied to pixels corresponding to the light-emitting element, whose output luminance is corrected or (b) levels of video signals to be supplied to pixels corresponding to the peripheral light-emitting elements, whose output luminances are corrected, the reference luminance being a luminance which is originally expected to be outputted from each of the plurality of light-emitting elements.

As described above, a liquid crystal display device of the present invention includes: a display panel in which a plurality of pixels are arranged; a backlight section including (i) a plurality of light-emitting elements arranged in matrix and (ii) a plurality of photosensors arranged in matrix; a video signal processing section for carrying out a video signal process on a plurality of input video signals supplied to the display device; and an area driving section for (i) dividing a display region, which is constituted by the plurality of pixels as a whole, into a plurality of small regions and (ii) supplying, as light-emitting element data and to corresponding one of the plurality of light-emitting elements, an output luminance modulated in accordance with a level of a video signal, out of the plurality of video signals, to be supplied to a pixel contained in one of the plurality of small regions, the area driving section including a light-emitting element correcting section and a luminance data creating section, the light-emitting element correcting section creating a light-emitting element correction signal by use of (i) the light-emitting element data supplied from the area driving section, (ii) the information on the measured luminances of the plurality of light-emitting elements, the information being obtained by the plurality of photosensors, and (iii) the positional information of the plurality of light-emitting elements, the positional information being also obtained by the plurality of photosensors, the light-emitting element correction signal being a signal for correcting (a) an output luminance of a specific light-emitting element whose measured luminance is deviated from a reference luminance or (b) an output luminance of a peripheral light-emitting element which is provided around the specific light-emitting element, the luminance data creating section controlling a level of a video signal, out of the plurality of video signals, to be supplied to (a) the specific light-emitting element, whose output luminance is corrected or (b) the peripheral light-emitting element, whose output luminance is corrected, control of the level of the video signal being carried out so that transmittances of a plurality of pixels centered about a pixel corresponding to a center of the specific light-emitting element have a transmittance distribution which exhibits a change reverse to that of a luminance distribution of the specific light-emitting element and the peripheral light-emitting element.

As described above, a display control method for a display device of the present invention is a display control method which includes the steps of: correcting luminances of peripheral light-emitting elements, which are provided around a specific light-emitting element, so as to compensate a luminance deviation of the specific light-emitting element from a reference luminance; and correcting transmittances of peripheral pixels, located around a pixel corresponding to a center of the specific light-emitting element so that the peripheral pixels have transmittance distributions which exhibit respective changes reverse to those of a luminance distribution of the specific light-emitting element and the peripheral light-emitting elements.

Therefore, it becomes possible to provide a display device and a display control method which can correct luminance non-uniformity of or a color drift in a display plane, which is caused by differences in the luminance of a backlight and/or aged deterioration, without causing (i) a reduction in luminance over an entire screen and (ii) a loss in display gray scales.

BRIEF DESCRIPTION OF DRAWINGS

FIG. 4 is a view illustrating (i) correction of luminances relating to LEDs G of an LED backlight employing LEDs R, G, and B and (ii) correction of transmittances of a liquid crystal panel.

FIG. 5 is a block diagram of a liquid crystal display device in accordance with another example of the present invention.

FIG. 9 is an explanatory view illustrating how in-plane luminance non-uniformity occurs in a liquid crystal display device in which a conventional LED backlight is employed. (a) of FIG. 9 is a view illustrating how in-plane luminance non-uniformity occurs in a liquid crystal display device in which a conventional LED backlight is employed. (b) of FIG. 9 is a view illustrating a state in which the in-plane luminance non-uniformity is corrected in the liquid crystal display device in which the conventional LED backlight is employed.

FIG. 10 is a circuit configuration diagram of a control system of a conventional liquid crystal display device.

DESCRIPTION OF EMBODIMENTS

An embodiment of the present invention will be described below with Examples 1 through 3, with reference to FIGS. 1 through 8.

Example 1

Figure 1:
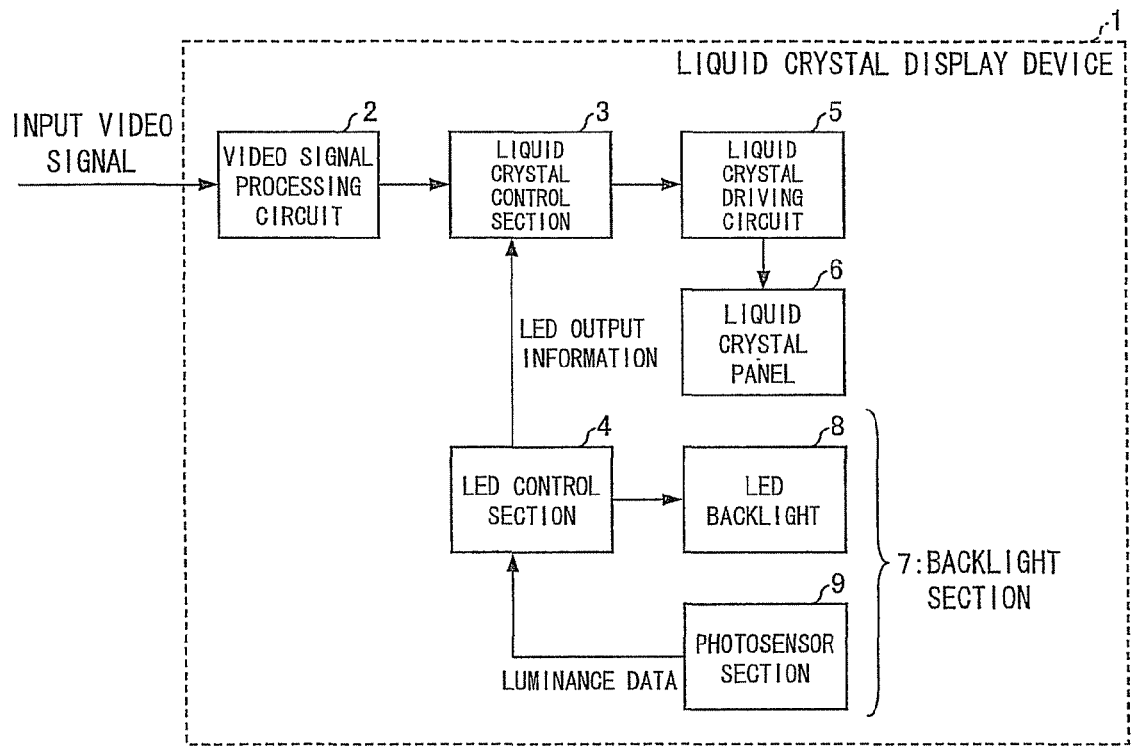
FIG. 1 is a block diagram of a liquid crystal display device in accordance with an example of the present invention.

FIG. 1 is a block diagram of a liquid crystal display device (display device) 1 in accordance with Example 1. The liquid crystal display device 1 includes a video signal processing circuit (video signal processing section) 2, a liquid crystal control section (display control section) 3, an LED control section (light-emitting element control section) 4, a liquid crystal driving circuit 5, a liquid crystal panel (display panel) 6, and a backlight section 7. A plurality of pixels are arranged in the liquid crystal panel 6. The backlight section 7 includes (i) an LED backlight 8, in which a plurality of LEDs (light-emitting elements) 10 (see FIG. 2) are provided and (ii) a photosensor section 9, in which a plurality of photosensors 11 (see FIG. 2) are provided.

The liquid crystal display device 1 employs the LED backlight 8, which is a direct backlight in which the plurality of LEDs 10 are arranged in a matrix manner. Note that the liquid crystal display device 1 does not carry out area active driving. In the area active driving, a display region of the liquid crystal panel 6 is divided into a plurality of regions, and light emission intensities of respective LEDs 10 corresponding to each of the plurality of regions is controlled in accordance with luminances of respective input video signals for the each of the plurality of regions.

The video signal processing circuit 2 carries out a video signal process, such as a color adjustment, an edge adjustment, and a noise reduction process, with respect to an input video signal supplied to the liquid crystal display device 1. That is, the video signal processing circuit 2 carries out a video signal process so as to display an optimum video.

In the backlight section 7, a plurality of photosensors 11 are arranged in a matrix manner, like the LEDs 10. Luminance information of each of the plurality of LEDs 10 is obtained by ones of or a corresponding one of the plurality of photosensors 11. The luminance information thus obtained is supplied to the LED control section 4.

A relation in number between the plurality of LEDs 10 arranged in a matrix manner and the plurality of photosensors 11 arranged in a matrix manner is not particularly important. Specifically, the relation in number can be one-to-one, in which each of the plurality of photosensors 11 is provided for a corresponding one of the plurality of LEDs 10. Alternatively, photosensors 11 can correspond to an LED 10 around which the photosensors 11 are located. Inversely, each photosensor 11 can correspond to plural LEDs 10.

Figure 2:
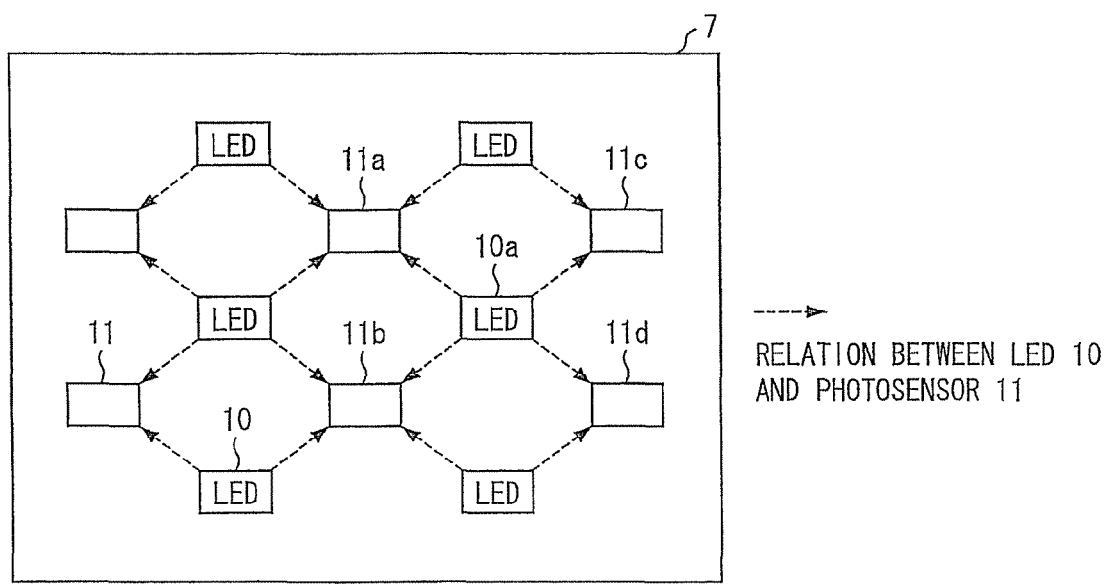
FIG. 2 is a plan view illustrating a best arrangement of LEDs and photosensors in a backlight section in accordance with an example of the present invention.

FIG. 2 is a plan view illustrating one of best arrangements of the plurality of LEDs 10 and the plurality of photosensors 11 in the backlight section 7. The relation in number between the plurality of LEDs 10 and the plurality of photo sensors 11 is almost one-to-one. The relation allows an improvement in measurement accuracy by finding a mean value of luminances, of an LED 10, detected by four photosensors 11 around the LED 10. The arrows in FIG. 2 indicate relations between the plurality of LEDs 10 and the plurality of photosensors 11. A luminance of an LED 10a, for example, is measured by use of four photosensors 11a, 11b, 11c, and 11d around the LED 10a. The plurality of LEDs 10 are not turned on all at once but are sequentially turned on one by one. A luminance of an LED 10 that is turned on is read out from photosensors 11 located around the LED 10.

Apart from the photosensors 11 arranged in a matrix manner, the luminance data can be obtained in the liquid crystal display device 1 by a luminance measuring instrument capable of measuring a luminance distribution in a two-dimensional plane. Note that the photosensors 11 can be photo transistors, photo diodes, or photo resistors.

By use of (a) information of measured luminances, of the LEDs 10, obtained by the photosensors 11 and (b) positional information of the LEDs 10, the LED control section 4 carries out control so as to correct (i) an output luminance of an LED 10 whose measured luminance deviates from a reference luminance or (ii) output luminances of LEDs 10 arranged around the LED 10. For example, if there is a region where a measured luminance is lower than the reference luminance, the LED control section 4 carries out control so as to increase output luminances of LEDs 10 around the region. If a measured luminance in a region is significantly higher than the reference luminance, the LED control section 4 carries out control so as to decrease an output luminance of the LED 10 in the region. The LED control section 4 then supplies control information of the LEDs 10 (output luminance information of the LEDs 10 and positional information of the LEDs 10) to the liquid crystal control section 3.

The liquid crystal control section 3 carries out control on the basis of (a) video signals which have been subjected to the video signal process and supplied from the video signal processing circuit 2 and (b) the control information of the LEDs 10 supplied from the LED control section 4. Specifically, the liquid crystal control section 3 carries out control so as to (i) decrease levels of video signals in a region where the output luminances of the LEDs 10 are increased or (ii) increase levels of video signals in a region where the output luminances of the LEDs 10 are decreased. That is, the liquid crystal control section 3 carries out control so as to (i) decrease transmittances of a region, of the liquid crystal panel 6, corresponding to the region where the output luminances of the LEDs 10 are increased or (ii) increase transmittances of a region, of the liquid crystal panel 6, corresponding to the region where the output luminances of the LEDs 10 are decreased.

With the controls, in-plane luminance non-uniformity of the liquid crystal display device 1 is corrected. This causes the video signals to be adjusted so that in-plane luminance uniformity of the liquid crystal display device 1 is attained. The liquid crystal driving circuit 5 causes the video signals, supplied from the liquid crystal control section 3, to be displayed, as a video, on the liquid crystal panel 6.

Note that, in correction of transmittances of the liquid crystal panel 6 as described above, (i) luminances of peripheral LEDs, which are arranged around a specific LED (specific light-emitting element) whose light-emitting ability is reduced, are increased and (ii) pixels, which are located around a pixel corresponding to a center of the specific LED, are corrected so as to have transmittance distributions which exhibit respective changes reverse to those of a luminance distribution of the specific LED and the peripheral LEDs. This will be later described in detail with reference to FIG. 4.

Likewise, as for one of the peripheral LEDs whose output luminances are increased, transmittances of a plurality of pixels located concentrically around the peripheral LED are corrected so that (i) a transmittance of a pixel corresponding to a center of the peripheral LED is the lowest and (ii) the farther a pixel is away from the peripheral LED, the higher transmittance the pixel has. Thus, the transmittance distribution, obtained in a case where the peripheral LED is centrally-located, has a change reversed to a luminance distribution obtained in a case where the peripheral LED is centrally-located.

Figure 3:
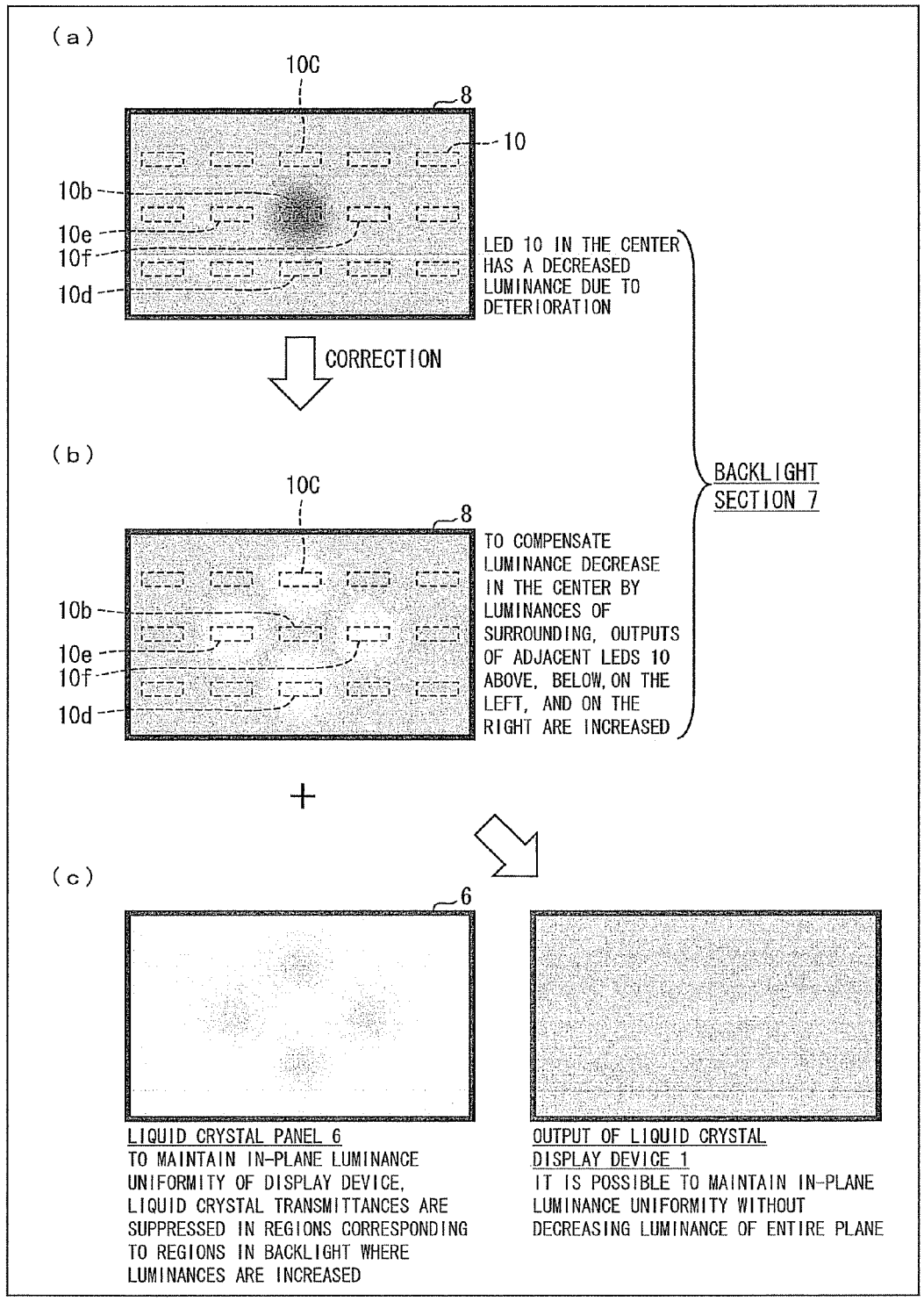
FIG. 3 is an explanatory view for describing correction of a luminance of an LED and correction of a transmittance in a liquid crystal display device in accordance with an example of the present invention. (a) to (d) of FIG. 3 are plan views illustrating correction of luminances of LEDs and correction of transmittances in a liquid crystal display device in accordance with an example of the present invention.

FIG. 3 is an explanatory view for describing correction of a luminance of an LED 10 and correction of a transmittance of the liquid crystal panel 6 in the liquid crystal display device 1 in accordance with Example 1. (a) through (d) of FIG. 3 are plan views illustrating correction of luminances of LEDs 10 and correction of transmittances of the liquid crystal panel 6 in the liquid crystal display device 1 in accordance with Example 1.

(a) and (b) of FIG. 3 illustrate an example arrangement of the LEDs 10 in the LED backlight 8 and surface luminance distributions of the LED backlight 8.

(a) of FIG. 3 illustrates an example luminance distribution of the LED backlight 8 obtained in a state where an LED 10b in the center, for example, has a decrease in luminance due to deterioration. The LED 10b is a poorly light-emitting element (a specific light-emitting element), whose measured luminance is lower than the reference luminance. (b) of FIG. 3 illustrates a luminance distribution obtained in a case where output luminances of, for example, the LEDs 10c, 10d, 10e, and 10f respectively located above, below, to the left of, and to the right of the LED 10b, are increased so that the decrease in luminance in the center in (a) of FIG. 3 is compensated by LEDs around the center.

The photosensor 11 of the photosensor section 9 in FIG. 1 (i) obtains luminance information (e.g. a rate of decrease in luminance of the LED 10b thus deteriorated) and positional information (e.g. an LED number corresponding to a position of an LED 10) and (ii) supplies the luminance information and the positional information to the LED control section 4. On the basis of the luminance information and the positional information, the LED control section 4 (i) selects LEDs 10 whose output luminances are to be increased and (ii) determines amounts by which the output luminances of the LEDs 10 are increased. The LED control section 4 then supplies output signals to respective LEDs thus selected. In addition to this, the LED control section 4 supplies control information to the liquid crystal control section 3. Luminance information to be included in the control information can be a rate of decrease in luminance of a deteriorated LED or an amount of increase in output luminance of the deteriorated LED.

Part of light emitted from peripheral LEDs, located around the deteriorated LED, is received by a pixel near a center corresponding to the deteriorated LED, an amount of which part will be referred to as a leaking light amount (luminance). An output luminance Vout of each of the peripheral LEDs is shown by the following formula (1) where Vin is an unincreased output luminance of the peripheral LED and h(m) is a function (i) which is obtained based on the leaking light amount (luminance), (ii) whose input is a luminance ((reference luminance)−(measured luminance)) required by a region of the deteriorated LED, and (iii) whose output is an increase in output luminance of the peripheral LED.

$$V\text{out} = V\text{in} + h(m) = V\text{in} + h((\text{reference luminance}) - (\text{measured luminance})) \quad (1)$$

Note that the reference luminance in the present embodiment is a luminance that is originally expected to be outputted by the LEDs 10 and is a designed value set at a design stage.

In order to fix the function h((reference luminance) (measured luminance)) in the formula (1), it is necessary that LEDs whose outputs are to be increased be specified in advance. Although the LEDs whose outputs are to be increased vary depending on how LEDs are arranged, it is preferable to select from LEDs which are arranged symmetrical to each other with respect to a symmetry center, i.e., the deteriorated LED. For example, it is possible to specify in advance (i) a first set of four LEDs located above, below, on the left of, and on the right of the deteriorated LED or (ii) a set of eight LEDs made up of the first set of four LEDs and a second set of four LEDs located on the upper right, the lower right, the lower left, and the upper left of the deteriorated LED. Alternatively, it is possible to determine whether to use the first set of four LEDs or the set of eight LEDs depending on a degree of deterioration of the deteriorated LED. If the LEDs whose outputs are to be increased are selected from LEDs which are an equal distance away from the deteriorated LED, only one type of the function h ((reference luminance)–(measured luminance)) is required. This facilitates control.

The liquid crystal control section 3 corrects, on the basis of the control information (an amount of increase in output luminance, and the positional information) of the LEDs, the video signals so as to attain uniform in-plane output luminance of the liquid crystal display device 1. (c) of FIG. 3 illustrates a liquid crystal transmitted distribution of luminances, which distribution is observed as a result of correction carried out, with respect to video signals for a white display over an entire screen. In the liquid crystal panel 6 illustrated in (c) of FIG. 3, it is necessary that a transmittance of the liquid crystal be adjusted in accordance with how output light of an LED itself spreads (i.e., luminance distribution). That is, in order to maintain uniformity of in-plane luminance of the liquid crystal display device 1, it is necessary that transmittances of the liquid crystal be suppressed in a region corresponding to the region, in the backlight section 7, where the luminance is increased.

A level LCDout(x,y) of a corrected video signal is shown by the following formula (2) where LCDin(x,y) is a level of an input video signal and psf(x,y) is a point spread function (PSF), which is information on how output light spreads.

$$\text{LCDout}(x,y) = \text{LCDin}(x,y) - \text{psf}(x,y) \quad (2)$$

Combination of the LED backlight 8 illustrated in (b) of FIG. 3 and the liquid crystal panel 6 illustrated in (c) of FIG. 3 makes it possible to attain, as illustrated in (d) of FIG. 3, uniformity of in-plane luminance of the liquid crystal display device 1, without causing a decrease in luminance of the entire plane of the liquid crystal display device 1.

What is actually supplied to the liquid crystal control section 3 is normal video signals. As such, for a region where an output luminance of an LED is increased as early described, the liquid crystal control section 3 (i) decreases a level of an input video signal by a certain percent that varies in accordance with an amount by which the output luminance is increased and (ii) outputs the input video signal as an output video signal. The liquid crystal control section 3 can have an LUT (Look up table) (i) whose inputs are (a) degrees of increase in output luminance of an LED and (b) levels of an input video signal and (ii) whose outputs are corrected levels of an output video signal to be outputted from the liquid crystal control section 3.

FIG. 3 has shown a case where the luminance of the LED 10*b* in the center is decreased due to the deterioration. Note, however, that even in a case where the LED 10*b* in the center is an LED (a highly light-emitting element, a specific light-emitting element) having a significantly high luminance (the measured luminance is higher than the reference luminance), it is possible to correct video signals so as to attain uniformity in in-plane output luminance of the liquid crystal display device 1. Particularly, if LEDs whose outputs are to be decreased are selected from LEDs that are an equal distance away from the LED having the significantly high luminance, only one type of function h((reference luminance)–(measured luminance)) is required. This facilitates control.

The liquid crystal display device 1 illustrated in FIG. 1 has been described on the assumption that the LED backlight 8 employs white LEDs 10. Note, however, that a similar correction can be carried out even in a case where the LED backlight 8 employs LEDs R, G, and B.

Now, the following description will discuss a case where an LED G 10G-2 in a region (small region) whose output luminance is decreased due to deterioration. An LED 10G-1, the LED 10G-2, and an LED 10G-3 illustrated in FIG. 4 are each originally capable of outputting a luminance of 100 with 100% of their respective abilities under a circumstance in which no deterioration occurs. However, the LED 10G-2 is in a state in which it is able to output a luminance of 80, even with 100% of its ability, due to deterioration.

In view of the circumstances, output luminances of respective of the LED 10G-1 and the LED 10G-3, which are located around the LED 10G-2, are increased from 100 (100%) to 125 (125%). In this manner, a luminance in the region where the luminance is decreased is corrected.

Concurrently, excess luminance in the region where the output luminances are increased are canceled out by decreasing transmittances of pixels G of the liquid crystal panel 6. Specifically, transmittances are decreased from 100% to 80% in regions, in the liquid crystal panel 6 illustrated in FIG. 4, which correspond to the respective LEDs 10G-1 and 10G-3 whose output luminances are increased. This makes it possible to correct in-plane color unevenness without causing a decrease in output luminance of the liquid crystal display device 1.

As described above, according to the liquid crystal display device 1 of Example 1, both (i) control of luminances of LEDs 10 and (ii) control of levels of video signals to be supplied to pixels are carried out. This makes it possible to correct non-uniformity of luminance of the liquid crystal panel 6, which non-uniformity is caused by an LED 10 that emits light with a luminance deviating from a reference luminance.

More specifically, the controls of the invention described above encompass the following controls.

(First Control)

In a case where an LED 10 emitting light with a luminance deviating from the reference luminance is detected by the photosensor 11, (i) luminances of LEDs 10 located around the LED 10 are controlled so that the luminance deviating from the reference luminance is compensated and (ii) levels of video signals, to be supplied to pixels corresponding to the LEDs 10 whose luminances are changed, are controlled so as to have changes reverse to those of the luminances. This makes it possible to maintain uniformity of luminance of the liquid crystal panel 6 even if luminances of light emitted from the LEDs 10 are changed.

Note that 'a luminance deviating from the reference luminance' encompasses (i) a luminance that exceeds the reference luminance and becomes therefore too 'bright' and (ii) a luminance that is below the reference luminance and becomes therefore 'dark.'

(Second Control)

Control is carried out so as to (i) cause an LED 10, which has become 'dark' due to a decrease in its light-emitting ability, to emit light with a maximum luminance and (ii) increase a level of a video signal to be supplied to a pixel corresponding to the LED 10. This makes it possible to maintain uniformity of luminance of the liquid crystal panel 6 even if a luminance of light emitted from the LED 10 is changed.

According to the first or second control, it becomes possible to correct in-plane luminance non-uniformity of the liquid crystal display device, so that the liquid crystal display device 1 has a uniform in-plane luminance. This makes it possible to correct luminance non-uniformity of or a color drift in a display plane, which is caused by differences in the luminance of a backlight and/or aged deterioration, without causing (i) a reduction in luminance over an entire screen and (ii) a loss in display gray scales.

Example 2

Another example of the present invention will be described below with reference to FIGS. 5 and 6. Note that configurations of Example 2 other than configurations to be described in Example 2 are the same as those of early-described Example 1. For easy explanation, the same reference signs will be given to members each having the same function as a member illustrated in the figures of Example 1, and descriptions on such a member will be omitted.

FIG. 5 is a block diagram showing a liquid crystal display device 12 in accordance with Example 2. The liquid crystal display device 12 is different from the liquid crystal display device 1 illustrated in FIG. 1 in that an area active driving circuit (area driving section) 13 is provided. The area active driving circuit 13 supplies, to the LED control section 4, output luminances modulated in accordance with levels of video signals to be supplied to pixels in one of a plurality of regions into which a display region, which is constituted by the entire plurality of pixels, is divided. In this case, the reference luminance serves as a reference of the output luminances thus modulated.

The reference luminance is the one for the output luminance which is modulated in accordance with the level of the video signal to be supplied to the pixel contained in one of the plurality of regions. Thus, in area active driving, the reference luminance fluctuates in real time in accordance with the level of the video signal. This makes it possible to carry out a display without causing the luminance to be non-uniform among the plurality of regions.

The area active driving circuit 13 includes a γ transformation section 14, a liquid crystal data calculation section (display data calculation section) 15, an LED data calculation section (light-emitting element data calculation section) 16, and a γ inverse transformation section 17.

The liquid crystal data calculation section 15 includes a divider 18 and a resolution adjustment section (first resolution adjustment section) 19. The LED data calculation section 16 includes a resolution adjustment section (second resolution adjustment section) 20, a luminance data creating section 21, and a drive current calculation section 22.

A video signal supplied to the area active driving circuit is first subjected to γ transformation in the γ transformation section 14 so as to be transformed into an optically linear space, and is then supplied to the LED data calculation section 16 and the liquid crystal data calculation section 15.

The area active driving circuit 13 creates, on the basis of the video signal supplied from the video signal processing circuit 2, (i) liquid crystal data (display data) to be displayed on the liquid crystal panel 6 and (ii) LED data (light-emitting element data). The LED data is created by finding an amount of light emitted by LEDs in every set of a certain number of display regions of the LED backlight 8.

According to the LED data calculation section 16, the resolution adjustment section 20 carries out a resolution adjustment with respect to a resolution difference between a resolution of the liquid crystal panel 6 and a resolution of the number of divided regions in the LED backlight 8. The resolution adjustment is carried out by downsampling the video signal to the number equal to the number of the divided regions in the LED backlight 8. The luminance data creating section 21 creates, on the basis of the video signal thus downsampled, LED light emission luminance data for each region. The LED light emission luminance data thus created is (i) transformed by the drive current calculation section 22 into a signal for actually driving an LED 10 and (ii) supplied to the liquid crystal data calculation section 15.

According to the liquid crystal data calculation section 15, the resolution adjustment section 19 re-transforms, in accordance with the resolution of the liquid crystal panel 6, the LED light emission luminance data supplied from the LED data calculation section 16. The divider 18 divides the video signal, which has been subjected to the γ transformation, by the LED light emission luminance data. This causes the liquid crystal data to be created. The liquid crystal data is subjected to γ inverse transformation in the γ inverse transformation section 17 and is then supplied to the liquid crystal control section 3.

As described above, the LED data calculation section 16 and the liquid crystal data calculation section 15 in the area active driving circuit 13 enables, in principle, the video signal, which is supplied to the liquid crystal display device 12, to be reproduced properly by use of the LED backlight 8 and the liquid crystal panel 6, each of which is subjected to a local modulation control.

Figure 6:
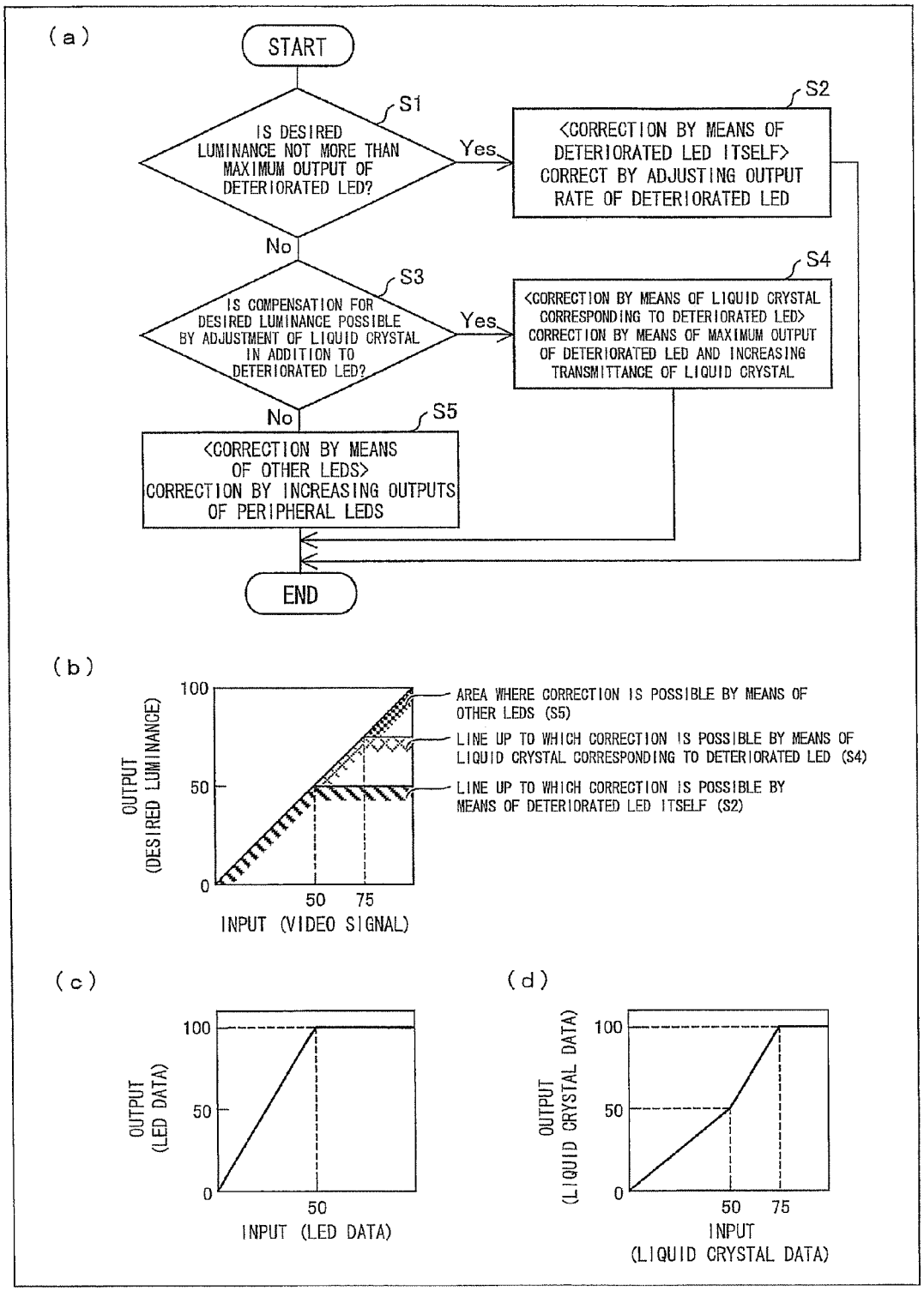
FIG. 6 is an explanatory view for describing operations of an LED control section in a liquid crystal display device in accordance with another example of the present invention. (a) of FIG. 6 is a flowchart showing details of operations of an LED control section in a liquid crystal display device in accordance with another example of the present invention. (b) of FIG. 6 is a graph showing limits for carrying out corrections of the respective steps S2, S4, and S5 on a level of a supplied video signal in a case where an LED can output a luminance that is only 50% of the reference luminance of other LEDs which are not deteriorated. (c) of FIG. 6 is a graph showing a correction table of LED data corresponding to a case where the correction at step S2 (correction by means of deteriorated LED itself) is employed. (d) of FIG. 6 is a graph showing a correction table of LED data corresponding to a case where the correction at step S4 (correction by means of liquid crystal corresponding to deteriorated LED) is employed.

The following description will discuss, with reference to an explanatory view of FIG. 6, details of operations of the LED control section 4 in the liquid crystal display device 12 employing the area active driving circuit 13.

In a case where the LED backlight 8 is driven by area active driving, (i) a position at which an LED 10 is caused to emit light and (ii) a light emission luminance of the LED 10 are determined in accordance with a supplied video signal.

Consider a case where, for example, (i) output luminances of the LEDs 10 are made uniform over the entire screen in the liquid crystal display device 12 and (ii) an LED 10 in the center is deteriorated (see the LED 10b illustrated in (a) of FIG. 3) to a degree that the LED 10 in the center can only output a luminance that is 50% of the reference luminance of other LEDs 10 that are not deteriorated.

In a case where a video that does not require the LED 10 in the center to emit light is supplied, there is no need to correct the luminance of the LED 10 in the center, which LED 10 has been deteriorated (no correction).

In a case where (i) a video that requires the LED 10 in the center to emit light is supplied and (ii) a luminance that is originally expected to be outputted by the LED 10 in the center, which LED 10 has been deteriorated, is not higher than 50% of the reference luminance (i.e., not higher than a maximum output luminance that can be outputted by the LED 10 in the center, which LED 10 has been deteriorated (Yes at step S1)), an output of the LED 10 in the center is adjusted by the LED itself (<correction by means of deteriorated LED itself> at step S2). An output luminance Vout of an LED is shown by the following formula (3) where Vin is an input value of the LED.

$$Vout=Vin\times((\text{reference luminance}(100\%))/(\text{measured luminance}(50\%))) \quad (3)$$

In a case where (i) a video that requires the LED 10 in the center to emit light is supplied and (ii) a luminance that is originally expected to be outputted by the LED 10 in the center, which LED 10 has been deteriorated, is not lower than 50% of the reference luminance (No at step S1), it is possible to make correction by (i) causing the LED 10 in the center, which LED 10 has been deteriorated, to output the maximum output luminance and (b) increasing transmittances of the liquid crystal panel 6 (i.e., increasing levels of video signals) so as to make up for a shortfall in luminance (Yes at step S3 and <correction by means of liquid crystal corresponding to deteriorated LED> at step S4). A level LCDout(x,y) of a video signal thus corrected is shown by the following formula (4) where psf(x,y) is a luminance distribution in a region where a shortfall in luminance occurs.

$$LCDout(x,y)=LCDin(x,y)+psf(x,y) \quad (4)$$

In a case where the luminance that is originally expected to be outputted cannot be attained even by the correction by means of the liquid crystal corresponding to the LED 10 in the center (No at step S3), it is still possible to make correction by increasing output luminances of peripheral LEDs by the same method as that of Example 1, so as to compensate for the luminance in a region of the LED in the center, which LED has been deteriorated (<correction by means of other LEDs> at step S5).

(a) of FIG. 6 is a flowchart showing details of operations of the LED control section 4 in the liquid crystal display device 12. The description above and (a) of FIG. 3 have discussed a case in which steps S1 through S5 are carried out in this order. Note, however, that the present embodiment is not limited to such a case but allows a configuration in which, for example, (i) only one of three types of correction is employed or (ii) any combination of the three types of correction can be employed.

In order to know, at step S1 of the flowchart in (a) of FIG. 6, a maximum output luminance of a deteriorated. LED, it is necessary that calibration be carried out at certain timing. In the calibration, LEDs 10 are sequentially turned on at their respective maximum output luminances and the photosensor 11 obtains luminance data of each of the LEDs 10. In a case where there is a deteriorated LED, a correction shown in the flowchart in (a) of FIG. 6 is carried out.

Needless to say, the calibration is carried out before initial shipment of a product. After shipment, the calibration is carried out (i) as instructed by a user when partial decrease in luminance is observed or (ii) automatically on a regular basis.

(b) of FIG. 6 is a graph showing limits for carrying out corrections of the respective steps S2, S4, and S5 with respect to a level of a supplied video signal in a case where an LED 10 can output a luminance that is only 50% of the reference luminance of other LEDs 10 which are not deteriorated. In a case where the video signal indicates display with a luminance of less than 50%, it is possible to carry out <correction by means of deteriorated LED itself> of step S2. In a case where the video signal indicates a display with a luminance of less than 75%, it is possible to carry out the correction by means of <correction by means of liquid crystal corresponding to deteriorated LED> of step S4. In a case where the video signal indicates display with a luminance of not less than 75%, it is necessary, to carry out <correction by means of other LEDs> of step S5.

(c) of FIG. 6 is a graph showing an example correction table of LED data corresponding to a case where the correction at step S2 (correction by means of deteriorated LED itself) is employed.

(d) of FIG. 6 is a graph showing an example correction table of LED data corresponding to a case where the correction at step S4 (correction by means of liquid crystal corresponding to deteriorated LED) is employed.

Note that the liquid crystal display device 12 of Example 2 can employ a configuration in which the LED control section 4 (i) stores maximum luminances of the respective plurality of LEDs 10 and (ii) controls a specific light-emitting element, whose measured luminance is deviated from the reference luminance, to emit light with the maximum luminance of the specific light-emitting element in a case where the maximum luminance of the specific light-emitting element is lower than the reference luminance as a result of comparison, and the liquid crystal control section 3 carries out control in which levels of video signals to be supplied to pixels corresponding to the specific light-emitting element are increased.

According to the configuration, it is possible to prevent generation of non-uniformity of luminance of a small region in which a specific light-emitting element is located whose light-emitting is poor and whose measured luminance is deviated from the reference luminance, by use of relatively simple controls in which only (i) control of a luminance of the specific light-emitting element and (ii) control of a video signal to be supplied to a pixel corresponding to the specific light-emitting element are carried out.

Note that the liquid crystal display device 12 can employ a configuration in which the LED control section 4 (i) stores maximum luminances of the respective plurality of LEDs 10 and (ii) carries out control in which output luminances of the peripheral light-emitting elements provided around a specific light-emitting element, whose measured luminance is deviated from the reference luminance, are increased in a case where the maximum luminance of the specific light-emitting element is lower than the reference luminance as a result of comparison, and the liquid crystal control section 3 carries out control in which levels of video signals to be supplied to pixels corresponding to the peripheral light-emitting elements provided around the specific light-emitting element are increased.

According to the configuration, it is possible to compensate insufficiency of luminance of the specific light-emitting element by increasing the output luminances of the light-emitting elements provided around the specific light-emitting element, in a case where it is not possible to prevent generation of non-uniformity of luminance by carrying out control in which (i) the specific light-emitting element is caused to emit light with a maximum luminance because the specific light-emitting element has too low a luminance and (ii) a level of a video signal to be supplied to a pixel corresponding to the specific light-emitting element is increased.

This makes it possible to prevent generation of non-uniformity of luminance in the small region in which the specific light-emitting element whose light-emitting is poor is located, irrespective of an extent to which the luminance of the specific light-emitting element is decreased.

A description has been given, in Example 2, on a state in which the deteriorated LED in the center can only output a luminance that is 50% of the reference luminance. The following description will discuss a case where the deteriorated LED in the center needs to output a luminance that is 75% of the reference luminance.

Luminance compensation in such a case can be carried out by causing peripheral LEDs to compensate a shortfall of 25% while the deteriorated LED in the center outputs a luminance of 50% of the reference luminance (50%+25%=75%).

Alternatively, it is possible to carry out the luminance compensation by changing where to allocate the 75%. Specifically, the deteriorated LED in the center can output 40% of the reference luminance and the peripheral LEDs can compensate a shortfall of 35% (40%+35%=75%). This can delay a progress of deterioration of the deteriorated LED and therefore prolong service, life, as compared with a case where the deteriorated LED in the center outputs 50% of the reference luminance.

The deteriorated LED in the center has to output a maximum luminance for a time period longer than usual. However, according to the allocation (40%+35%=75%), it is possible to prevent the deteriorated LED from further accelerating the deterioration.

Example 3

A further example of the present invention will be described below with reference to FIGS. 7 and 8. Note that configurations of Example 3 other than configurations to be described in Example 3 are the same as those of early-described Examples 1 and 2. For easy explanation, the same reference signs will be given to members each having the same function as a member illustrated in the figures of Examples 1 and 2, and descriptions on such a member will be omitted.

Figure 7:
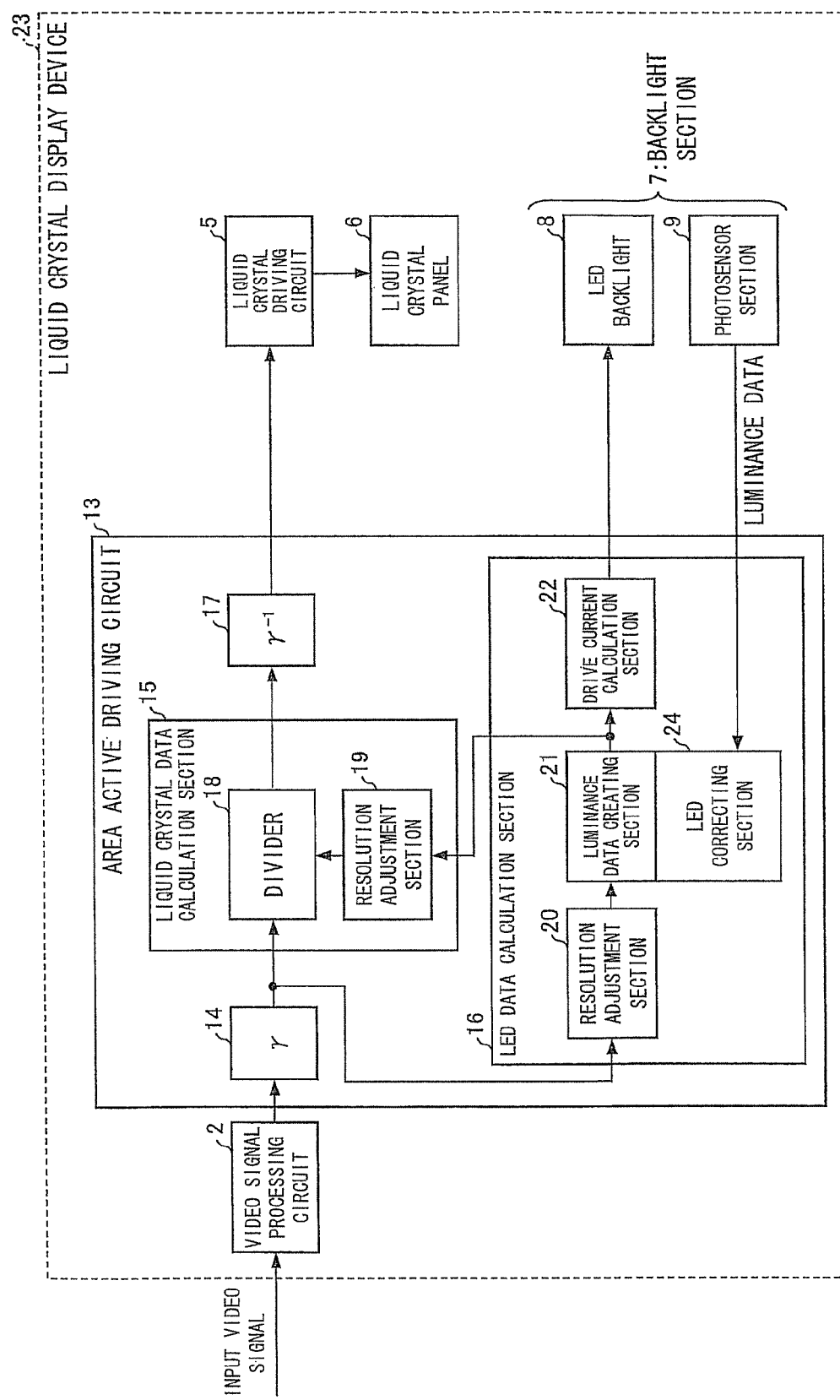
FIG. 7 is a block diagram of a liquid crystal display device in accordance with another example of the present invention.

FIG. 7 is a block diagram showing a liquid crystal display device 23 in accordance with Example 3. The liquid crystal display device 23 is different from the liquid crystal display device 12 illustrated in FIG. 2 in that (i) no liquid crystal control section 3 and no LED control section 4 are provided and (ii) an LED correcting section (light-emitting element correcting section) 24 is provided in the LED data calculation section 16.

In the liquid crystal display device 23 illustrated in FIG. 7, the LED correcting section 24 creates an LED correction signal (light-emitting element correction signal) by use of (i) the LED data supplied from the area active driving circuit 13, (ii) information on measured luminances of LEDs 10, which information is obtained by the photo sensor 11 and (iii) the positional information of the LEDs 10, which positional information is obtained by the photosensor 11.

The LED correction signal serves as a signal for correcting the LED data so as to increase (i) an output luminance of an LED 10 in a region where a luminance is decreased or (ii) output luminances of LEDs 10 located around the LED 10. The LED correction signal also serves as a signal for correcting the LED data so as to decrease (i) an output luminance of an LED 10 in a region where a luminance is significantly high or (ii) output luminances of LEDs 10 located around the LED 10.

The luminance data creating section 21 receives the LED correction signal from the LED correcting section 24 and creates corrected LED data. The LED data calculation section 16 supplies the corrected LED data to the liquid crystal data calculation section 15.

Note that LED data supplied to the liquid crystal data calculation section 15 is the corrected LED data, which has been corrected. As such, the divider 18 of the liquid crystal data calculation section 15 divides the video signal, which has been subjected to γ transformation, by the corrected LED data. Thus, the divider 18 outputs liquid crystal data, which reflects a result of correction of the luminances of the LEDs.

This eliminates the need for the liquid crystal, display device 23 to include the liquid crystal control section 3, which is provided in the liquid crystal display device 1 of Example 1 and in the liquid crystal display device 12 of Example 2. Since the LED correcting section 24 is provided in the area active driving circuit 13, correction can be carried out more efficiently and accurately.

Figure 8:
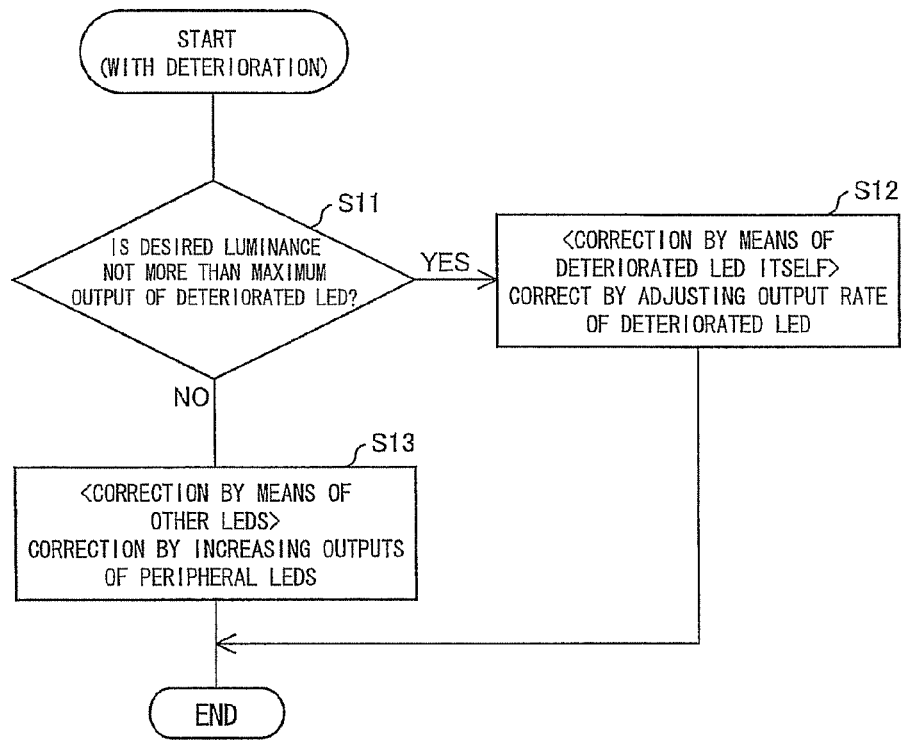
FIG. 8 is a flowchart showing details of operations of an LED correcting section in the liquid crystal display device illustrated in FIG. 7.

The following description will discuss, with reference to a flowchart of FIG. 8, details of operations of the LED correcting section 24 provided in the area active driving circuit 13 illustrated in FIG. 7.

In a case where the LED backlight 8 is driven by area active driving, (i) a position at which an LED 10 is caused to emit light and (ii) a light emission luminance of the LED 10 are determined in accordance with a supplied video signal.

Consider a case where, for example, (i) output luminances of the LEDs 10 are made uniform over the entire screen in the liquid crystal display device 23 and (ii) an LED 10 in the center is deteriorated (see the LED 10b illustrated in (a) of FIG. 3) to a degree that the LED 10 in the center can only output a luminance that is 50% of the reference luminance of other LEDs 10 that are not deteriorated.

In a case where a video that does not require the LED 10 in the center to emit light is supplied, there is no need to correct the luminance of the LED 10 in the center, which LED 10 has been deteriorated (no correction).

In a case where (i) a video that requires the LED 10 in the center to emit light is supplied and (ii) a luminance that is originally expected to be outputted by the LED 10 in the center, which LED 10 has been deteriorated, is not higher than the reference luminance (i.e., not higher than a maximum output luminance that can be outputted by the LED 10 in the center, which LED 10 has been deteriorated (Yes at step S11)), an output of the LED 10 in the center is adjusted by the LED itself (<correction by means of deteriorated LED itself> at step S12). For example, in a case where the luminance that is originally expected to be outputted is 50% of the reference luminance, it is only necessary that the output of the LED 10 which is deteriorated be set 100%.

In this case, LED output data is corrected by means of deteriorated LED itself so as to attain an output of 100%, but the luminance data of 50% is supplied to the liquid crystal data calculation section 15. Thus, the light emission luminance, with which actual display is carried out, is outputted. In this manner, the divider 18 of the liquid crystal data calculation section carries out division by use of information, on a luminance of the LED, with which luminance the display is ultimately carried out. This allows the liquid crystal data to be generated in accordance with the corrected LED data and therefore eliminates necessity of separately adjusting the liquid crystal data (<correction by means of deteriorated LED itself>).

In a case where the luminance that is originally expected to be outputted cannot be attained even by the <correction by means of deteriorated LED itself> of step S12, (No at step S11), it is still possible to make correction by increasing outputs of peripheral LEDs by the same method as that of Example 1, so as to compensate for the luminance in a region of the LED in the center, which LED has been deteriorated (<correction by means of other LEDs> at step S13).

As for peripheral regions of the LEDs whose output luminances are increased, LED output data, which is actually increased, is supplied, as the luminance data, to the liquid crystal data calculation section 15. As such, the region in the center where the LED is deteriorated, LED output data (e.g. LED data attaining the output of 100%) that corresponds to the luminance compensated by the peripheral LEDs is supplied, as the luminance data, to the liquid crystal data calculation section 15.

In this manner, the liquid crystal data calculation section 15 carries out division by use of information on a luminance of the LED, with which luminance the display is ultimately carried out. This allows the liquid crystal data to be generated in accordance with the corrected LED data and therefore eliminates necessity of separately adjusting the liquid crystal data (<correction by means of other LEDs>).

As described above, at steps S12 and S13, deterioration in an LED 10 is basically corrected by the LED 10 itself. Note, however, that the liquid crystal data is not calculated using the LED output data at this time. Instead, a luminance (i) which includes both a luminance in a deteriorated state and a corrected luminance that is excessive and (ii) with which display is actually carried out is converted to an original LED output data, and the original LED output data thus converted is used to calculate the liquid crystal data. This makes it possible to create the liquid crystal data in accordance with the corrected LED. It therefore becomes possible to (i) carry out processes efficiently and (ii) maintain accuracy of gray scales (bits) of the liquid crystal data and the LED data.

The description above and FIG. 8 has discussed a case in which steps S12 and S13 are carried out in this order. Note, however, that the present embodiment is not limited to such a case but allows a configuration in which, for example, (i) only one of two types of correction is employed or (ii) any combination of the two types of correction can be employed.

According to a display control method for a liquid crystal display device 1 in accordance with the present embodiment, the display control method is for a display device which displays a video on a liquid crystal panel 6 by modulating, on the basis of a video signal, transmittances of a plurality of pixels which transmittances are shown when light emitted from a plurality of LEDs 10, which are arranged in a matrix manner with respect to the liquid crystal panel 6 including the plurality of pixels, transmits through the plurality of pixels, said display control method comprising the steps of: correcting luminances of peripheral light-emitting elements, which are provided around a specific light-emitting element, so as to compensate a luminance deviation of the specific light-emitting element from a reference luminance; and correcting transmittances of peripheral pixels, located around a pixel corresponding to a center of the specific light-emitting element so that the peripheral pixels have transmittance distributions which exhibit respective changes reverse to those of a luminance distribution of the specific light-emitting element and the peripheral light-emitting elements.

According to the method, both (i) control of the luminances of the peripheral light-emitting elements and (ii) correction of the transmittances of the pixels are carried out. It is therefore possible to correct non-uniformity of luminance of the liquid crystal panel 6, which non-uniformity caused by a specific light-emitting element that emits light with a luminance deviated from the reference luminance. This allows the in-plane luminance of the liquid crystal display device 1 to be uniform. As such, it is possible to correct luminance non-uniformity of or a color drift in a display plane, which is caused by differences in the luminance of a backlight and/or aged deterioration, without causing (i) a reduction in luminance over an entire screen and (ii) a loss in display gray scales.

The display control method can further include the steps of: finding the reference luminance by using, as a reference, output luminances modulated in accordance with levels of video signals to be supplied to pixels in one of a plurality of regions into which a display region, constituted by the entire plurality of pixels, is divided.

The reference luminance serves as a reference of the output luminances which are modulated in accordance with the levels of the video signals to be supplied to the pixels in one of the plurality of regions. Thus, according to the area active driving in which output luminances are supplied which output luminances are modulated in accordance with levels of video signals to be supplied to pixels in one of a plurality of small regions into which a display region constituted by the entire plurality of pixels is divided, the reference luminance fluctuates in real time in accordance with the level of the video signal. This makes it possible to carry out a display without causing the luminance to be non-uniform among the small regions.

General Overview of Embodiment

The liquid crystal display devices 1, 12, and 23 can each employ a configuration in which (i) the LED 10b whose measured luminance is deviated from the reference luminance is a poorly light-emitting element, which measured luminance is lower than the reference luminance, (ii) the LED control section 4 increases the output luminances of the LEDs 10c, 10d, 10e, and 10f located around the poorly light-emitting element, and (iii) the liquid crystal control section 3 decreases levels of video signal levels to be supplied to pixels corresponding to the LEDs 10c, 10d, 10e, and 10f.

This makes it possible to maintain the luminance distribution of the liquid crystal display device 1 without causing a decrease in luminance over the entire plane of the liquid crystal display device 1, even in a case where the liquid crystal display device 1 has luminance non-uniformity due to the backlight section 7 having the poorly light-emitting element. The same applies to the liquid crystal display devices 12 and 23.

The liquid crystal display device 1 can employ a configuration in which the LEDs 10c, 10d, 10e, and 10f located around the poorly light-emitting element are an equal distance away from the poorly light-emitting element. This allows the LEDs 10c, 10d, 10e, and 10f, which are located around the poorly light-emitting element, to be controlled in the same manner. This facilitates control. The same applies to the liquid crystal display devices 12 and 23.

The liquid crystal display devices 1, 12, and 23 can each employ a configuration in which (i) the LED 10b whose measured luminance is deviated from the reference luminance is a highly light-emitting element, which measured luminance is higher than the reference luminance, (ii) the LED control section 4 decreases the output luminances of the LEDs 10c, 10d, 10e, and 10f located around the highly light-emitting element, and (iii) the liquid crystal control section 3 increases levels of video signal levels to be supplied to pixels corresponding to the LEDs 10c, 10d, 10e, and 10f.

This makes it possible to maintain the luminance distribution of the liquid crystal display device 1 without causing an increase in luminance over the entire plane of the liquid crystal display device 1, even in a case where the liquid crystal display device 1 has luminance non-uniformity due to the backlight section 7 having the highly light-emitting element. The same applies to the liquid crystal display devices 12 and 23.

The liquid crystal display device 1 can employ a configuration in which the LEDs 10c, 10d, 10e, and 10f located around the highly light-emitting element are an equal distance away from the highly light-emitting element. It follows that the LEDs 10c, 10d, 10e, and 10f can be controlled in the same manner. This facilitates control. The same applies to the liquid crystal display devices 12 and 23.

The liquid crystal display devices 12 and 23 can each further include an area active driving circuit 13 for supplying, to the LED control section 4, output luminances modulated in accordance with levels of video signals to be supplied to pixels in one of a plurality of regions into which a display region, constituted by the entire plurality of pixels, is divided. The reference luminance can serve as a reference of the output luminances thus modulated.

The reference luminance serves as a reference of the output luminances which are modulated in accordance with the levels of the video signals to be supplied to the pixels contained in one of the plurality of regions. Thus, according to the area active driving, the reference luminance fluctuates in real time in accordance with the level of the video signal. This makes it possible to carry out a display without causing the luminance to be non-uniform among the regions.

The liquid crystal display devices 12 and 23 can each employ a configuration in which the LED control section 4 (i) stores maximum luminances of the respective LEDs 10 and controls a specific light-emitting element, whose measured luminance is deviated from the reference luminance, to emit light with a maximum luminance of the specific light-emitting element in a case where the maximum luminance of the specific light-emitting element is lower than the reference luminance as a result of comparison, and the liquid crystal display control section 3 carries out control in which levels of video signals to be supplied to pixels corresponding to the specific light-emitting element are increased.

According to the configuration, it is possible to prevent generation of non-uniformity of luminance of a small region in which a specific light-emitting element is located whose light-emitting is poor and whose measured luminance is deviated from the reference luminance, by use of relatively simple controls, in which only (i) control of a luminance of the specific light-emitting element and (ii) control of a video signal to be supplied to a pixel corresponding to the specific light-emitting element are carried out.

The liquid crystal display device can employ a configuration in which the LED control section 4 (i) stores maximum luminances of the respective LEDs 10 and (ii) carries out control in which output luminances of the peripheral light-emitting elements provided around a specific light-emitting element, whose measured luminance is deviated from the reference luminance, are increased in a case where the maximum luminance of the specific light-emitting element is lower than the reference luminance as a result of comparison, and the liquid crystal control section 3 carries out control in which levels of video signals to be supplied to pixels corresponding to the peripheral light-emitting elements provided around the specific light-emitting element are increased.

According to the configuration, it is possible to compensate insufficiency of luminance of the specific light-emitting element by increasing the output luminances of the light-emitting elements provided around the specific light-emitting element, in a case where it is not possible to prevent generation of non-uniformity of luminance by carrying out control in which (i) the specific light-emitting element is caused to emit light with a maximum luminance because the specific light-emitting element has too low a luminance and (ii) a level of a video signal to be supplied to a pixel corresponding to the specific light-emitting element is increased.

This makes it possible to prevent generation of non-uniformity of luminance in the small region in which the specific light-emitting element whose light-emitting is poor is located, irrespective of an extent to which the luminance of the specific light-emitting element is decreased.

According to the liquid crystal display devices 12 and 23, the area active driving circuit 13 can include: a γ transformation section 14; a liquid crystal data calculation section 15 including a divider 18 and a resolution adjustment section 19; an LED data calculation section 16 including a resolution adjustment section 20, a luminance data creating section 21, and a drive current calculation section 22; and a γ inverse transformation section 17.

A video signal supplied to the area active driving circuit is first subjected to γ transformation in the γ transformation section 14 so as to be transformed into an optically linear space, and is then supplied to the LED data calculation section 16 and the liquid crystal data calculation section 15.

The area active driving circuit 13 creates, on the basis of the video signal supplied from the video signal processing circuit 2, (i) liquid crystal data to be displayed on the liquid crystal panel 6 and (ii) LED data. The LED data is created by finding an amount of light emitted by LEDs in every set of a certain number of display regions of the backlight section 7.

According to the LED data calculation section 16, the resolution adjustment section 20 carries out a resolution adjustment with respect to a resolution difference between a resolution of the liquid crystal panel 6 and a resolution of the number of divided regions in the backlight section 7. The resolution adjustment is carried out by downsampling the video signal to the number equal to the number of the divided regions in the backlight section 7. The luminance data creating section 21 creates, on the basis of the video signal thus downsampled, LED light emission luminance data for each region. The LED light emission luminance data thus created is (i) transformed by the drive current calculation section 22 into a signal for actually driving an LED 10 and (ii) supplied to the liquid crystal data calculation section 15.

According to the liquid crystal data calculation section 15, the resolution adjustment section 19 re-transforms, in accordance with the resolution of the liquid crystal panel 6, the LED light emission luminance data supplied from the LED data calculation section 16. The divider 18 divides the video signal, which has been subjected to the γ transformation, by the LED light emission luminance data. This causes the liquid crystal data to be created. The liquid crystal data is subjected to γ inverse transformation in the γ inverse transformation section 17 and is then supplied to the liquid crystal control section 3.

As described above, the LED data calculation section 16 and the liquid crystal data calculation section 15 in the area active driving circuit 13 enables, in principle, the video signal, which is supplied to the liquid crystal display devices 12 and 23, to be reproduced properly by use of the backlight section 7 and the liquid crystal panel 6, each of which is subjected to a local modulation control.

The liquid crystal display device 1, 12, and 23 can each employ a configuration in which a relation in number between the LEDs 10 and the photosensors 11 is (i) a one-to-one relation, in which each of the LEDs 10 is provided for a corresponding one of the plurality of photosensors 11, (ii) a relation in which a plurality of photosensors 11 are provided for each of the LEDs 10, or (iii) a relation in which at least two of the LEDs 10 is provided for each of the plurality of photosensors 11.

In each of the liquid crystal display devices 1, 12, and 23, the photosensors 11 can be photo transistors, photo diodes, or photo resistors.

The display control method can further include the steps of: finding the reference luminance by using, as a reference, output luminances modulated in accordance with levels of video signals to be supplied to pixels in one of a plurality of regions into which a display region, constituted by the entire plurality of pixels, is divided.

The reference luminance serves as a reference of the output luminances which are modulated in accordance with the levels of the video signals to be supplied to the pixels in one of the plurality of regions. Thus, according to the area active driving in which output luminances are supplied which output luminances are modulated in accordance with levels of video signals to be supplied to pixels in one of a plurality of small regions into which a display region constituted by the entire plurality of pixels is divided, the reference luminance fluctuates in real time in accordance with the level of the video signal. This makes it possible to carry out a display without causing the luminance to be non-uniform among the small regions.

INDUSTRIAL APPLICABILITY

The display device and the display control method of the present invention make it possible to correct luminance non-uniformity of or a color drift in a display plane, which is caused by differences in the luminance of a backlight and/or aged deterioration, without causing (i) a reduction in luminance over an entire screen and (ii) a loss in display gray scales. Therefore, the display device and the display control method of the present invention can be suitably applied to a liquid crystal display device in which a backlight unit and a liquid crystal panel are employed.

REFERENCE SIGNS LIST 1, 12, and 23: liquid crystal display device (display device)
2: video signal processing circuit (video signal processing section)
3: liquid crystal control section (display control section)
4: LED control section (light-emitting element control section)
5: liquid crystal driving circuit
6: liquid crystal panel (display panel)
7: backlight section
8: LED backlight
9: photosensor section
10 and 10a: LED (light-emitting element)
10G-2 and 10b: LED (poorly light-emitting element, specific light-emitting element)
10G-1, 10G-3, 10c, 10d, 10e, and 10f: LED (peripheral light-emitting element)
11: photosensor
11a, 11b, 11c, and 11d: photosensor
13: area active driving circuit (area driving section)
14: γ transformation section
15: liquid crystal data calculation section (display data calculation section)
16: LED data calculation section (light-emitting element data calculation section)
17: γ inverse transformation section
18: divider
19: resolution adjustment section (first resolution adjustment section)
20: resolution adjustment section (second resolution adjustment section)
21: luminance data creating section
22: drive current calculation section
24: LED correcting section
S1 to S5 and S11 to S13: step

The invention claimed is:

1. A display device comprising:
a display panel in which a plurality of pixels are arranged;
a backlight section including (i) a plurality of light-emitting elements arranged in a matrix manner and (ii) a plurality of photosensors arranged in a matrix manner;
a video signal processing section configured to carry out a video signal process with respect to an input video signal supplied to the display device;
a light-emitting element control section configured to carry out control in which (i) an output luminance of at least one light-emitting element of the plurality of light-emitting elements whose measured luminance is deviated from a reference luminance or (ii) output luminances of peripheral light-emitting elements which are provided around the at least one light-emitting element are corrected, respectively, by use of control information of the plurality of light-emitting elements, which control information contains (a) information on measured luminances of the plurality of light-emitting elements, the information being obtained by the plurality of photosensors and (b) positional information of the plurality of light-emitting elements, the positional information being obtained by the plurality of photosensors; and
a display control section configured to control, on the basis of (i) a plurality of video signals which have been subjected to the video signal process and are supplied from the video signal processing section and (ii) the control information supplied from the light-emitting element control section, (a) levels of video signals to be supplied to pixels corresponding to the at least one light-emitting element, whose output luminance is corrected or (b) levels of video signals to be supplied to pixels corresponding to the peripheral light-emitting elements, whose output luminances are corrected,
the reference luminance being a luminance which is associated with an expected output from each of the plurality of light-emitting elements, wherein
when the at least one light-emitting element includes a measured luminance lower than the reference luminance,
the light-emitting element control section increases the output luminances of the peripheral light-emitting elements which are provided around the at least one light-emitting element,
the display control section decreases levels of video signals to be supplied to pixels corresponding to the peripheral light-emitting elements provided around the at least one light-emitting element, and transmittances of at least a portion of the plurality of pixels are corrected based on distances from at least one of the peripheral light-emitting elements, respectively, such that the farther one of the pixels of the portion of the plurality of pixels is away from the at least one peripheral light-emitting element, the higher the transmittance of the one pixel, the portion of the plurality of pixels located concentrically around the at least one of the peripheral light-emitting elements.

2. The display device of claim 1, wherein the peripheral light-emitting elements are an equal distance away from the at least one light-emitting element.

3. A display device comprising:
a display panel in which a plurality of pixels are arranged;
a backlight section including (i) a plurality of light-emitting elements arranged in a matrix manner and (ii) a plurality of photosensors arranged in a matrix manner;

a video signal processing section configured to carry out a video signal process with respect to an input video signal supplied to the display device;

a light-emitting element control section configured to carry out control in which (i) an output luminance of at least one light-emitting element of the plurality of light-emitting elements whose measured luminance is deviated from a reference luminance or (ii) output luminances of peripheral light-emitting elements which are provided around the at least one light-emitting element are corrected, respectively, by use of control information of the plurality of light-emitting elements, which control information contains (a) information on measured luminances of the plurality of light-emitting elements, the information being obtained by the plurality of photosensors and (b) positional information of the plurality of light-emitting elements, the positional information being obtained by the plurality of photosensors; and a display control section configured to control, on the basis of (i) a plurality of video signals which have been subjected to the video signal process and are supplied from the video signal processing section and (ii) the control information supplied from the light-emitting element control section, (a) levels of video signals to be supplied to pixels corresponding to the at least one light-emitting element, whose output luminance is corrected or (b) levels of video signals to be supplied to pixels corresponding to the peripheral light-emitting elements, whose output luminances are corrected, the reference luminance being a luminance which is associated with an expected output from each of the plurality of light-emitting elements, wherein when the at least one light-emitting element includes a measured luminance lower than the reference luminance, the light-emitting element control section decreases the output luminances of the peripheral light-emitting elements which are provided around the at least one light-emitting element, the display control section increases levels of video signals to be supplied to pixels corresponding to the peripheral light-emitting elements provided around the at least one light-emitting element, and transmittances of at least a portion of the plurality of pixels are corrected based on distances from at least one of the peripheral light-emitting elements, respectively, such that the farther one of the pixels of the portion of the plurality of pixels is away from the at least one peripheral light-emitting element, the lower the transmittance of the one pixel, the portion of the plurality of pixels located concentrically around the at least one of the peripheral light-emitting elements.

4. A display device of claim 1, further comprising:

an area driving section configured to supply, to the light-emitting element control section, output luminances modulated in accordance with levels of video signals to be supplied to pixels in one of a plurality of small regions into which a display region, constituted by the entire plurality of pixels, is divided, the reference luminance serving as a reference of the output luminances thus modulated.

5. The display device of claim 4, wherein:

the light-emitting element control section (i) stores maximum luminances of the respective plurality of light-emitting elements and (ii) controls the at least one light-emitting element, whose measured luminance is deviated from the reference luminance, to emit light with the maximum luminance of the at least one light-emitting element in a case where the maximum luminance of the at least one light-emitting element is lower than the reference luminance as a result of comparison, and the display control section carries out control in which levels of video signals to be supplied to pixels corresponding to the at least one light-emitting element are increased.

6. The display device of claim 4, wherein:

the light-emitting element control section (i) stores maximum luminances of the respective plurality of light-emitting elements and (ii) carries out control in which output luminances of the peripheral light-emitting elements provided around a the at least one light-emitting element, whose measured luminance is deviated from the reference luminance, are increased in a case where the maximum luminance of the at least one light-emitting element is lower than the reference luminance as a result of comparison, and the display control section carries out control in which levels of video signals to be supplied to pixels corresponding to the peripheral light-emitting elements provided around the at least one light-emitting element are increased.

7. The display device of claim 4, wherein the area driving section includes:

a γ transformation section;

a display data calculation section including a divider and a first resolution adjustment section;

a light-emitting element data calculation section including a second resolution adjustment section, a luminance data creating section, and a drive current calculation section; and a γ inverse transformation section.

8. The display device of claim 1, wherein a relation in number between the plurality of light-emitting elements and the plurality of photosensors is (i) a one-to-one relation, in which each of the plurality of light-emitting elements is provided for a corresponding one of the plurality of photosensors, (ii) a relation in which at least two of the plurality of photosensors are provided for each of the plurality of light-emitting elements, or (iii) a relation in which at least two of the plurality of light-emitting elements are provided for each of the plurality of photosensors.

9. The display device of claim 1, wherein the plurality of photosensors are photo transistors, photo diodes, or photo resistors.

10. The display device of claim 3, wherein the peripheral light-emitting elements are an equal distance away from the at least one light-emitting element.

11. A display device of claim 3, further comprising:

an area driving section configured to supply, to the light-emitting element control section, output luminances modulated in accordance with levels of video signals to be supplied to pixels in one of a plurality of small regions into which a display region, constituted by the entire plurality of pixels, is divided, the reference luminance serving as a reference of the output luminances thus modulated.

12. The display device of claim 11, wherein the area driving section includes:

a γ transformation section;

a display data calculation section including a divider and a first resolution adjustment section;

a light-emitting element data calculation section including a second resolution adjustment section, a luminance data creating section, and a drive current calculation section; and a γ inverse transformation section.

13. The display device of claim 3, wherein a relation in number between the plurality of light-emitting elements and the plurality of photosensors is (i) a one-to-one relation, in which each of the plurality of light-emitting elements is provided for a corresponding one of the plurality of photosensors, (ii) a relation in which at least two of the plurality of photosensors are provided for each of the plurality of light-emitting elements, or (iii) a relation in which at least two of the plurality of light-emitting elements are provided for each of the plurality of photosensors.

14. The display device of claim 3, wherein the plurality of photosensors are photo transistors, photo diodes, or photo resistors.

* * * * *